(12) United States Patent
Cesena et al.

(10) Patent No.: US 9,871,868 B2
(45) Date of Patent: Jan. 16, 2018

(54) COMPUTER-IMPLEMENTED METHODS, COMPUTER READABLE MEDIA, AND SYSTEMS FOR INITIATING CO-USE OF APPLICATIONS

(71) Applicant: OSIX Corporation, Redwood City, CA (US)

(72) Inventors: Adrian Cesena, Palo Alto, CA (US); Amir Ghazvinian, San Francisco, CA (US)

(73) Assignee: OSIX Corporation, Redwood City, CA (US)

(*) Notice: Subject to any disclaimer, the term of this patent is extended or adjusted under 35 U.S.C. 154(b) by 118 days.

(21) Appl. No.: 14/720,435

(22) Filed: May 22, 2015

(65) Prior Publication Data

US 2016/0014209 A1    Jan. 14, 2016

Related U.S. Application Data

(60) Provisional application No. 62/002,423, filed on May 23, 2014.

(51) Int. Cl.
*H01L 29/08* (2006.01)
*H04L 29/08* (2006.01)
*H04L 29/06* (2006.01)
*G06F 17/30* (2006.01)

(52) U.S. Cl.
CPC ...... *H04L 67/141* (2013.01); *G06F 17/30873* (2013.01); *H04L 67/146* (2013.01); *H04L 67/42* (2013.01)

(58) Field of Classification Search
CPC ..... H04L 67/141; H04L 67/146; H04L 67/42; G06F 17/30837
See application file for complete search history.

(56) References Cited

U.S. PATENT DOCUMENTS

| | | | |
|---|---|---|---|
| 2004/0181579 A1* | 9/2004 | Huck | G06Q 10/10 709/205 |
| 2011/0173589 A1* | 7/2011 | Guttman | G06F 17/30873 717/125 |
| 2013/0080420 A1* | 3/2013 | Taylor | H04L 67/02 707/722 |

(Continued)

FOREIGN PATENT DOCUMENTS

WO    2014/014695    1/2014

*Primary Examiner* — Brian J Gillis
*Assistant Examiner* — Steve Lin
(74) *Attorney, Agent, or Firm* — David R. Stevens; Stevens Law Group

(57) ABSTRACT

A system facilitates co-use of an interface by multiple client computer, such as co-browsing of a webpage. A first user computer using an interface transfers a state of the interface to a server, which uses the state to recreate the interface in a virtual client executed by the server. The interface is rendered on a virtual screen and images of the screen are transmitted to the first user computer and one or more second user computers performing co-use with the first user computer. For example, a browser rendering a webpage on a first computer transmits session data and cookies associated with the webpage to a virtual browser executing on a server system. The virtual browser retrieves the webpage and uses the session data and cookies to render the webpage on the virtual screen.

16 Claims, 15 Drawing Sheets

(56) References Cited

U.S. PATENT DOCUMENTS

| | | | |
|---|---|---|---|
| 2013/0159709 A1* | 6/2013 | Ivory | H04L 67/141 |
| | | | 713/168 |
| 2013/0311664 A1* | 11/2013 | Pirnazar | G06F 17/30873 |
| | | | 709/227 |
| 2013/0325967 A1 | 12/2013 | Parks et al. | |
| 2014/0115125 A1* | 4/2014 | Chen | H04W 76/045 |
| | | | 709/219 |
| 2015/0149916 A1* | 5/2015 | Mendez | G06F 17/30873 |
| | | | 715/738 |
| 2015/0199308 A1* | 7/2015 | Cooper | H04L 65/403 |
| | | | 715/235 |

* cited by examiner

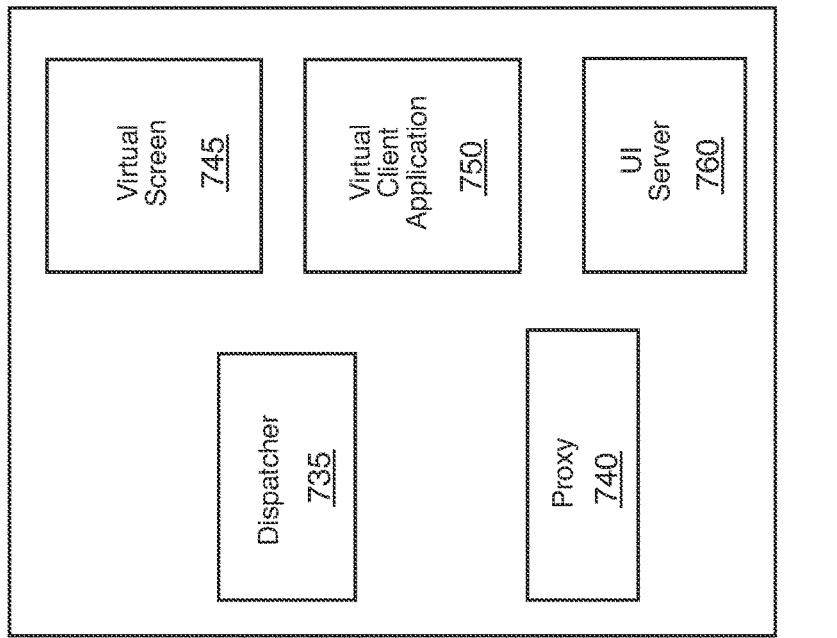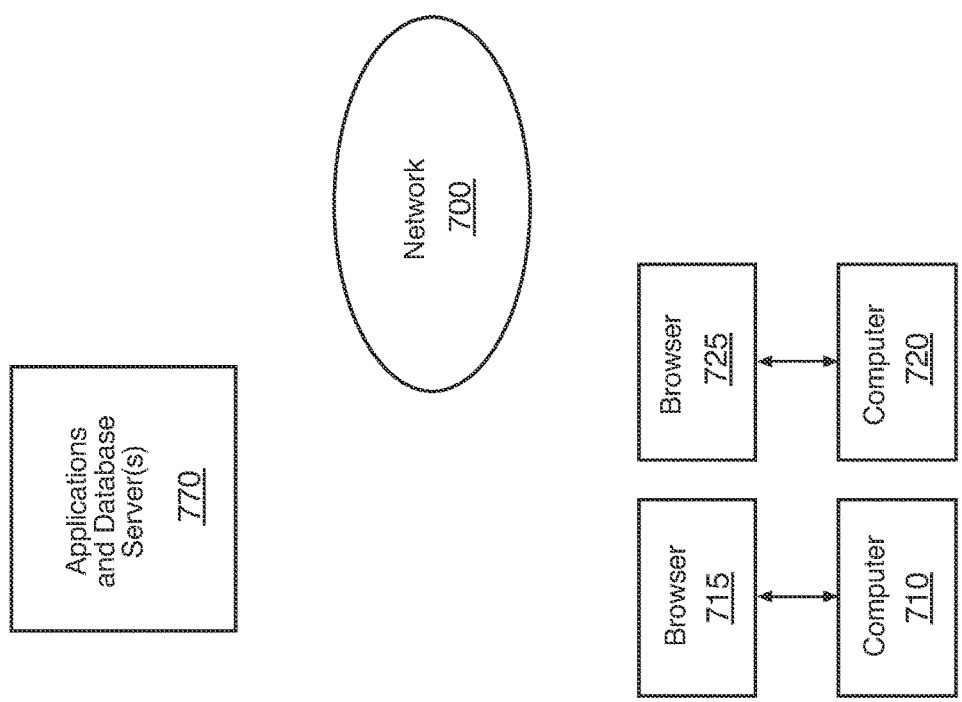
FIG. 7

COMPUTER-IMPLEMENTED METHODS, COMPUTER READABLE MEDIA, AND SYSTEMS FOR INITIATING CO-USE OF APPLICATIONS

RELATED APPLICATIONS

This application claims the benefit of U.S. Provisional Application Ser. No. 62/002,423 filed May 23, 2014 and entitled "Computer-Implemented Methods, Computer Readable Media, And Systems For Initiating Co-Use Of Applications," which is hereby incorporated herein by reference in its entirety.

RELATED APPLICATIONS

The present invention is related to the field of computing, and more specifically to techniques for initiating the use of applications over a network.

BACKGROUND

The Internet has become an essential medium for business and media. Although use of the Internet in modern society is essentially ubiquitous, one potential area of future expansion in the Internet is the ability for users to share online experiences. Sharing online experiences, such as visiting websites, is one way for users to have a social experience on the Internet. These shared online experiences often take the form of co-browsing. In general, co-browsing is joint navigation of websites by multiple people that access web pages at the same time. Some current techniques for co-browsing require special software at the client and/or co-browsing enabled websites. Since users may only co-browse on web sites that are co-browsing enabled, this technology limits the users to only a small subset of Internet sites. As a consequence, it is desirable to create a co-browsing system that does not require special plug-ins or co-browsing enabled websites so as to permit users to co-browse at any website.

SUMMARY OF THE INVENTION

In one aspect of the invention, a method includes retrieving, by a browser executing on a first user computer, an interface from a remote server. The method further includes receiving, by the local client executing on the first user computer, user interactions with the interface and updating, by the local client executing on the first user computer, a state of the local client according to the interface and the user interactions with the interface. The local client further receives an instruction to initiate co-use with a second user computer remote from the first user computer. In response to receiving the instruction to initiate co-browsing, the local client may transmit the state of the client to a server system, receive a virtual screen image including a rendering of the interface by a virtual client having the state of the local client and executing on the server system, receive interactions with the virtual screen image.

In another aspect of the invention, the interface is a webpage and the state of the local client includes cookies and session data for the webpage stored by the local client.

In some embodiments, the method includes transmitting, by the local client executing on the first user computer, the interactions with the virtual screen image to the virtual client.

In some embodiments, the method further includes receiving, by the local client executing on the first user computer, updates to the virtual screen image, the updates responsive to interactions received by the virtual client from the second user computer.

In some embodiments, the method includes, in response to receiving the instruction to initiate co-use, transmitting to the server system references to functions effective to instantiate the virtual client on the server system.

In another aspect of the invention, a method for performing co-using of an application includes receiving, by a server system, from a first user computer, an instruction to initiate co-use of an interface to a remote server with one or more second user computers. The method further includes receiving, by the server system, from the first user computer a state of a first client executing on the first user computer and currently displaying the interface. In response to receiving the instruction to initiate co-use of the interface with the one or more second user computers, the method further includes performing, by the server system—(a) retrieving the interface by a virtual client from the remote server and recreating the state of the interface by the virtual client; (b) rendering, by the virtual client, in a virtual screen, the interface according to the state of the first client; and (c) transmitting images of the virtual screen to the first user computer and the one or more second user computers.

In some embodiments, the first client is a first browser and the state of the first client includes cookies and session data for a webpage accessed by the first browser.

In some embodiments, the method further includes receiving, from the first user computer, interactions with the image of the virtual screen; and inputting, by the server system, the interactions to the virtual client.

In some embodiments, the The method of claim 8, further includes (a) transmitting, by the virtual client, interface actions corresponding to the interactions to the remote server associated with the interface; (b) receiving, by the virtual client, a response to the interface actions from the remote server; (c) updating, by the virtual client, the virtual screen according to the response; and (d) transmitting, by the server system, an updated image of the virtual screen to the first user computer and the one or more second user computers.

In some embodiments, receiving from the first user computer, the instruction to initiate co-use of the interface with one or more second user computers further comprises receiving references to functions effective to instantiate the virtual client on the server system.

In some embodiments, at least one of the first user computer device and the one or more second computer devices is a mobile computing device.

In some embodiments, the method further includes executing a user interface server by the server system, the user interface server receiving inputs from the first and second user computers and inputting them to the virtual client; and executing a translator proxy by the server system, the translator proxy having a persistent networking connection to the interface server and remote network connections to the first and second user computers, the persistent networking connection persisting independent of the remote network connections to the first and second user computers.

In another aspect of the invention, a system for performing co-browsing includes a server comprising one or more server processors and one or more server memory devices storing server executable code. The server executable code is effective to cause the one or more server processors to—
 (1) receive from a first user computer, an instruction to initiate co-browsing of a webpage with one or more second user computers;

(2) receive from the first user computer a state of a first browser executing on the first user computer and currently browsing the webpage; and (2) in response to receiving the instruction to initiate co-browsing of the webpage with the one or more second user computers, (a) retrieve the webpage from a webserver by a virtual browser and recreating the state of the first browser by the virtual browser, (b) render, by the virtual browser, in a virtual screen, the webpage according to the state of the first browser, (c) transmit images of the virtual screen to the first user computer and the one or more second user computers.

In some embodiments, the state of the first browser includes cookies and session data for the webpage stored by the first browser. The one or more server memory devices further store server executable data effective to cause the one or more server processors to receive interactions with the image of the virtual screen; and input the interactions to the virtual browser.

In some embodiments, the one or more server memory devices of the server further store server executable data effective to cause the one or more server processors to: (a) transmit webpage actions corresponding to the interactions to a webserver associated with the webpage; receive, by the virtual browser, a response to the webpage actions from the webserver; (b) update, by the virtual browser, the virtual screen according to the response; (a) transmit an updated image of the virtual screen to the first user computer and the one or more second user computers.

The system of claim 13, wherein the one or more server memory devices of the server further store server executable data effective to cause the one or more server processors to: (a) receive from the first user computer, the instruction to initiate co-browsing of the webpage with one or more second user computers by receiving references to functions effective to instantiate the virtual browser on the server system; and (b) execute the functions effective to instantiate virtual browser in response to receiving the references to the functions.

In some embodiments, the system further includes the first user computer, the first user computer comprising one or more first user processors and one or more first user memory devices operably coupled to the one or more processors and storing executable code effective to cause the one ore more first user processors to: (a) retrieve by a first browser the webpage from the webserver; (b) receiving, by the first browser, user interactions with the webpage; (c) updating, by the first browser, the state of the first browser according to the webpage and the user interactions with the webpage; (d) receiving, by the first browser executing on the first user computer, a user input instructing the first browser to initiate co-browsing with the one or more second user computers remote from the first user computer; and (e) in response to receiving the user input to initiate co-browsing—(i) transmit, by the first browser, the state of the first browser to the serer system; (ii) receive, by the first browser, the images of the virtual screen; and (iii) receive, by the first browser, interactions with the images of the virtual screen.

In some embodiments, the one or more first user memory devices further store executable code effective to cause the one ore more first user processors to transmit, by the first browser, the interactions with the images of the virtual screen.

In some embodiments, the one or more first user memory devices further store executable code effective to cause the one ore more first user processors t receive, by the first browser, updates to the virtual screen, the updates responsive to the interactions.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 is a block diagram illustrating one embodiment for a computer architecture to support remote operation of applications for use by one or more computing devices.

DETAILED DESCRIPTION

Figure 1:
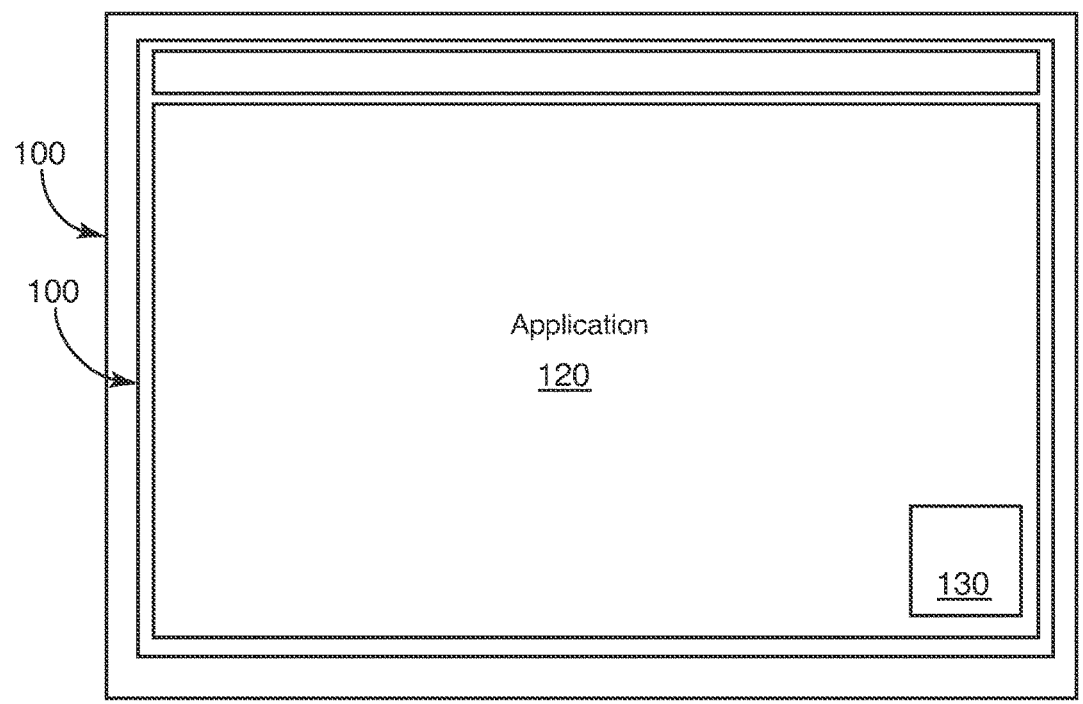
FIG. 1 is a block diagram illustrating an embodiment of an application configured to initiate the co-use of a virtual application over a network.

The present invention is related to the field of computing, and more specifically to techniques for initiating the use of applications over a network.

The Internet has become an essential medium for business and media. Although use of the Internet in modern society is essentially ubiquitous, one potential area of future expansion in the Internet is the ability for users to share online experiences. Sharing online experiences, such as visiting websites, is one way for users to have a social experience on the Internet. These shared online experiences often take the form of co-browsing. In general, co-browsing is joint navigation of websites by multiple people that access web pages at the same time. Some current techniques for co-browsing require special software at the client and/or co-browsing enabled websites. Since users may only co-browse on web sites that are co-browsing enabled, this technology limits the users to only a small subset of Internet sites. As a consequence, it is desirable to create a co-browsing system that does not require special plug-ins or co-browsing enabled websites so as to permit users to co-browse at any website. Similarly, it is desirable to provide users with convenient techniques for initiating such a co-browsing system.

A computer-implemented method, computer readable medium and system allow one or more computer devices to be co-users of an application. That is, the devices may participate in the use of the same application, or "co-use" the application. As described within, embodiments using a browser are exemplary and the methods should be understood to apply to computer applications generally.

A computer-implemented method, computer readable medium, and system permit co-browsing of one or more websites between at least two users. In embodiments, a host toggles a button integrated into a browser running on a first computer device to initiate a co-browsing session over a network. A dispatcher (or manager) receives the request and initiates batch processes to instantiate a virtual screen, a virtual browser, and a user interface (UI) server on at least one server. That is, the toggling of the browser button initiates the instantiation of an application program on the at least one server so as to run a "virtual browser" on the server. The virtual browser may be used in a co-browsing session with multiple users.

The virtual browser is configured to interact with a plurality of websites. The virtual browser receives, from the first computer device, a first input data that specifies a request to enter a session at one of the websites and receives, from a second computer device, a second input data for the session at the Website. The virtual browser generates one or more requests to the website based on the first and second input data. The virtual browser receives, in response to the request to the website, response data from the website. The server transmits from the virtual browser to the first and second computer devices the response data from the website.

In embodiments, the toggling of the button integrated into the browser of the first computer device causes cookies and other session information to be retrieved or "lifted" from the first computer device. The cookies and session information are sent to the virtual server. The virtual browser is then configured (or "shaped") in light of the retrieved cookies and session information to re-create the appearance of the browser on the first computer device near the time the browser button was toggled. In other words, the browser lifts the cookies and session information and uses them to prepopulate the virtual browser. In this manner, browser data that was tied to the computer device is made to reside elsewhere, where it may be used in a co-browsing session with multiple users. In embodiments, the toggling of the button integrated into the browser of the first computer device initiates the instantiation of a co-browsing session, including the instantiation of a UI server, a "virtual" browser and a translator proxy or intermediate proxy server. The UI server receives, from the first computer device, first input data that specifies a request to enter a web-browsing session and receives, from a second computer device, second input data for the web-browsing session. In some embodiments, the UI server communicates with the computer devices through the translator proxy. For example, the UI server receives and sends data to the first and second computer devices through the translator proxy. In some embodiments, the computer devices communicate with the translator proxy via a WebSocket protocol. In some embodiments, the translator proxy communicates with the UI server over a TCP connection. The virtual browser generates one or more requests to websites based on the first and second input data from the computer devices. The virtual browser receives, in response to requests to websites, response data from the websites. The UI server transmits to the computer devices, via the translator proxy, the response data from the websites.

In some embodiments, the toggling of the button integrated into the browser to initiate the instantiation of the virtual browser passes a reference, e.g., a uniform resource locater (URL), to a function or set of functions that instantiates the virtual browser.

In embodiments, a virtual browser facilitates co-browsing and is initiated by a button, incorporated into the browser, or a link to an external location, displayed by a browser. The activation of the link on the webpage initiates the instantiation of the virtual browser on at least one server. The virtual browser is configured to interact with a plurality of websites. The virtual browser receives, from the first computer device, a first input data that specifies a request to enter a session at one of the websites and receives, from a second computer device, a second input data for the session at the Website. The virtual browser generates one or more requests to the website based on the first and second input data. The virtual browser receives, in response to the request to the website, response data from the website. The server transmits from the virtual browser to the first and second computer devices the response data from the website.

In embodiments the activation of a link within a webpage to initiate the instantiation of the virtual browser passes a reference, e.g., a uniform resource locater (URL), to a function or set of functions that instantiates the virtual browser.

In embodiments the activation of a link within a webpage to initiate the instantiation of the virtual browser causes cookies and other session information to be retrieved or "lifted" from the first computer device. The cookies and session information are sent to a virtual server. The virtual browser is then configured in light of the retrieved cookies and session information to re-create the appearance of the browser on the first computer device near the time the link was activated. In this manner, browser data that was tied to the computer device is made to reside elsewhere, where it may be used in a co-browsing session with multiple users.

In embodiments, the activation of a button integrated into a browser of a first computer device initiates the instantiation of a co-browsing session in which a UI server is instantiated on the first computer device and a translator proxy is instantiated on a virtual server. The UI server monitors incoming data from browsers of co-browsing computers and inputs the incoming data to the browser of the first computer device. The UI server monitors browser screen data and user input from the first computer device and transmits the screen data and input from the first computer device to the co-browsing computers. The UI server may communicate with the co-browsing computers through a translator proxy.

In some embodiments, a UI server receives input data from first and/or second computer devices from a translator proxy. The first and/or second computer devices connect to the translator proxy using the WebSocket protocol. The translator proxy connects to the UI server using any protocol connection, such as a TCP connection. This allows long-lived connections to be maintained between the translator proxy and the UI server while implementing the WebSocket protocol for communications with the client devices. The use of the translator proxy reduces the number of disconnection incidences with the first and/or second computer devices and subsequently the time associated with those incidents.

In some embodiments, the computer devices may comprise a mobile computing device (e.g., mobile phone, tablet computer, etc.). In the same or other embodiments, the computer device may comprise a plurality of computer devices. Under this embodiment, the computer devices may co-use the virtual application such that the UI server collects keystrokes, clicks and cursor position from multiple computer devices for input to the virtual application. In addition, the virtual screen is replicated so as to allow the computer devices to co-use the application.

FIG. 1 is a block diagram illustrating an embodiment of an application configured to initiate the co-use of a virtual application over a network. As shown in FIG. 1, a computer 100 with a display 110 is running an application 120 equipped with a button 130. In embodiments, application 120 is a computer program, such as a browser, that a user of computer 100 may desire to use, share with, or otherwise show to a second user who is located elsewhere. To facilitate the launch of a session in which the first and second users co-use application 120, application 120 is equipped with button 130 the activation of which initiates a session in which the second user and additional users may be invited to co-use a version of application 120. In embodiments, a host toggles button 130 integrated into application 120, e.g., a browser, running on computer device 100 to initiate a co-browsing session over a network. A dispatcher (or manager) receives the request and initiates batch processes to instantiate a virtual screen, a virtual browser, and a user interface (UI) server on at least one server. That is, the toggling of the browser button initiates the instantiation of an application program on the at least one server so as to run a "virtual browser" on the server. In embodiments, button 130 may initiate the co-use of application 120 by passing a reference, e.g., a uniform resource locater (URL), over a network to a function or set of functions that instantiates the co-use. In embodiments, button 130 may be a link within a webpage that initiates the co-use of application 120. In embodiments, the activation of the link may initiate the co-use of application 120 by passing a reference, e.g., a uniform resource locater (URL), over a network to a function or set of functions that instantiates the co-use. In embodiments, button 130 may initiate the retrieving of cookies and other session information from computer 100 to facilitate re-creating the state of application 120 at the time co-use was initiated.

Figure 2:
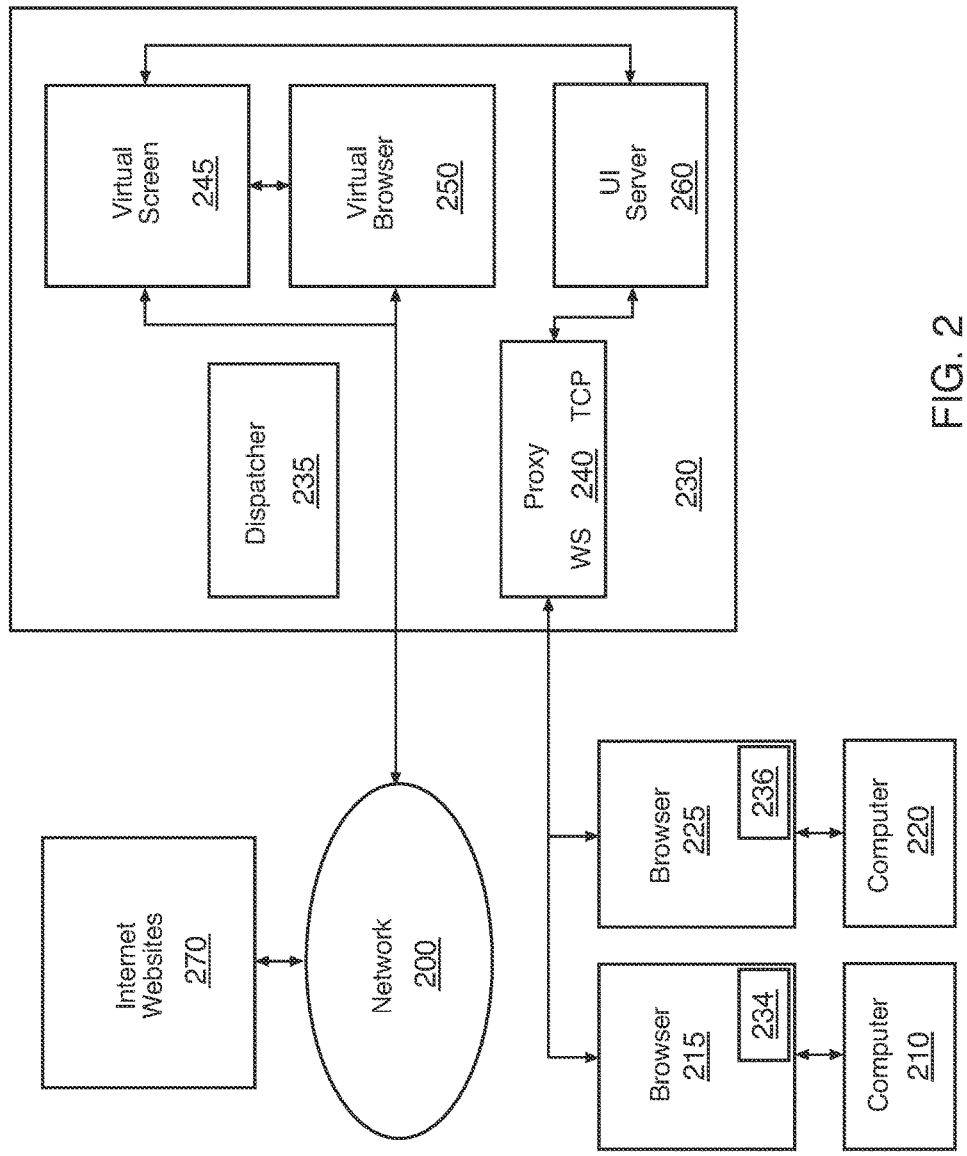
FIG. 2 is a block diagram illustrating an embodiment of a system configured to initiate the co-use of a virtual application.

FIG. 2 is a block diagram illustrating an embodiment of a system configured to initiate the co-use of a virtual application. To illustrate the co-use of an application, this example describes a co-browsing session. Requests to begin Web co-browsing sessions are initiated by users toggling buttons 234 and 236 that are integrated into browsers 215 and 225. Dispatcher 235 receives requests to begin Web browsing sessions and, in turn, initiates, as a batch process, virtual screen 245, virtual browser 250, UI server 260, and translator proxy 240 processes. Dispatcher 235 may also be called a "manager." After a session has been started, computers 210 and 220 access the batch processes through translator proxy 240. In conducting a co-browsing session, users, from computers 210 and 220, operating through their respective browsers (215 and 225), access a virtual browser 250 on virtual server 230 via network 200 (virtual server 230 should be understood to be connected to computers 210 and 220 through network 200, though the connections are not shown in FIG. 2). The virtual browser 250 operates to access Internet websites 270 through network 200. The virtual screen 245 stores screen data for replication to computers 210 and 220. UI server 260 monitors incoming data from browsers (215 and 225) of computers (210 and 220) and inputs the incoming data to virtual screen 245 and UI server 260. UI server 260 may run communication protocols, such as virtual network computing (VNC), or remote desktop protocol (RDP).

In embodiments, the toggling of buttons 234 and 236 causes cookies and other session information to be retrieved or "lifted" from computers 210 and 220. The cookies and session information are sent to virtual server 230. Virtual browser 250 and virtual screen 245 are then configured in light of the retrieved cookies and session information to re-create the appearance of the browser on the initiating computer near the time the link was activated. In this manner, browser data that was tied to the initiating computer is made to reside elsewhere, where it may be utilized in subsequent co-browsing sessions. And, consequently, such co-browsing users may view the virtual browser with the appearance that, perhaps, motivated the user of the initiating computer to initiate the co-browsing session.

Although the state (cookies, session information, etc.) of a browser on a computer 210, 220 is lifted and co-browsing with a virtual browser 250 is performed using that state as disclosed herein, there are many other non-browser applications that can be virtualized and co-used using the systems and methods disclosed herein. With respect to the translator proxy 240, networking protocols for a browser may not be available for non-browser applications (e.g. HTML). However, any delivery methods or network protocols used by other applications may be implemented by the translator proxy 240 in order to facilitate communication with virtualizations of other applications implemented by the virtual server 230.

With respect to clients of other applications, any session data, persistently stored state information similar to cookies, and a history of prior sessions or interactions defined for a particular application model may be used as the "state" of that client and may be transferred to a virtual server 230 in order to recreate that state in a virtual client the same manner as for the state of a browser is created in a virtual browser 250 as described herein.

For example, co-use of applications for sharing media and documents may be performed using the methods disclosed herein. State information transferred to a virtual client may include media and asset files from client side, which may then be available to the virtual client as available inputs. For example, media and asset files may be available for co-using applications such as PDF (portable document format) viewers and PDF form filling, map viewing and manipulation, and other types of media sharing (audio, videos, etc).

For applications that require local file system access, a file chooser may be virtualized and linked from the virtual server 230 to the local file system of a computer 210, 220 that initiated co-used as described herein, essentially bridging virtualized applications (e.g. a virtual browser or other virtual client) with client file system state and assets. Accordingly, information to facilitate this virtualization of the local file system of the computer 210, 220 may be part of the "state" of a client transferred to a virtual server 230 for recreating a state of a virtual client according to the methods described herein.

The translator proxy 240 can play a part in bidirectional delivery of any of these states, including the files and other assets noted above. Translator proxy 240 may further facilitate delivery between a computer 210, 220 and virtual server 230, such as delivery of an instruction set to begin co-use from client to virtual server 230; a user interface from virtual server 230 to client, session data, cookies, and/or history from client to virtual server 230; images from virtualized applications (e.g. virtual browser or other virtual client) to a client; HTML from virtualized application to client, and the like.

In embodiments, the toggling of buttons 234 and 236 may initiate the instantiation of virtual browser 250 by passing a reference, e.g., a uniform resource locater (URL), to a function or set of functions that instantiates virtual browser 250 and related processes on virtual server 230.

In embodiments, translator proxy 240 is instantiated on the same server or is within the same private network as the UI server. Computers 210 and 220 connect to translator proxy 240 using a WebSocket protocol. Translator proxy 240 connects to UI server 260 using any protocol, such as a TCP connection. Being confined within the same server, this TCP connection allows long-lived connections to be maintained between the translator proxy and the UI server. The use of a separate translator proxy 240 supports implementing the most up-to-date WebSocket protocol to communicate with the client devices, independent of protocols supported by the UI server. The translator proxy is described more fully with reference to elements 740 (FIG. 7) and 1040 (FIG. 10), within.

The UI server may implement multiple services (e.g. VNC, RDP, and others). These services may connect to the translator proxy 240 using a long-lived connection, such as a TCP connection. As individual user computers 210, 220 connect and reconnect to the translator proxy, individual connections between each user computer 210, 220 and each of the services implemented by the UI server is not required. Each user computer 210, 220 need only connect to the translator proxy 240, which already maintains a persistent connection with each service.

In operation, users, through computers 210 and 220, access Websites (Internet websites 270). Users enter website information into their respective browsers (215 and 225). This website information is input to the virtual browser 250 by way of translator proxy 240, UI server 260, and virtual screen 245. Virtual browser 250, operating like browser 215 and 225, accesses the Internet websites through a standard HTTP TCP/IP protocol. Virtual browser 250 transmits the website information, input by the users, to the Internet websites 270, and retrieves website response data returned by the Website. The response data is transferred to the virtual screen 245, and subsequently transmitted to computers 210 and 212, through browsers, for display at computers 210 and 212.

As the sessions are co-browsing, any user (user of computer 210 or user computer 220) may input information (keystrokes, clicks and cursor position), and the input information is both displayed on the virtual screen and interpreted for a web request to the Internet websites 270. In some embodiments, the co-browsing session designates a host and one or more guests. For this embodiment, the host may initiate a co-browsing session with one or more guests.

Figure 3:
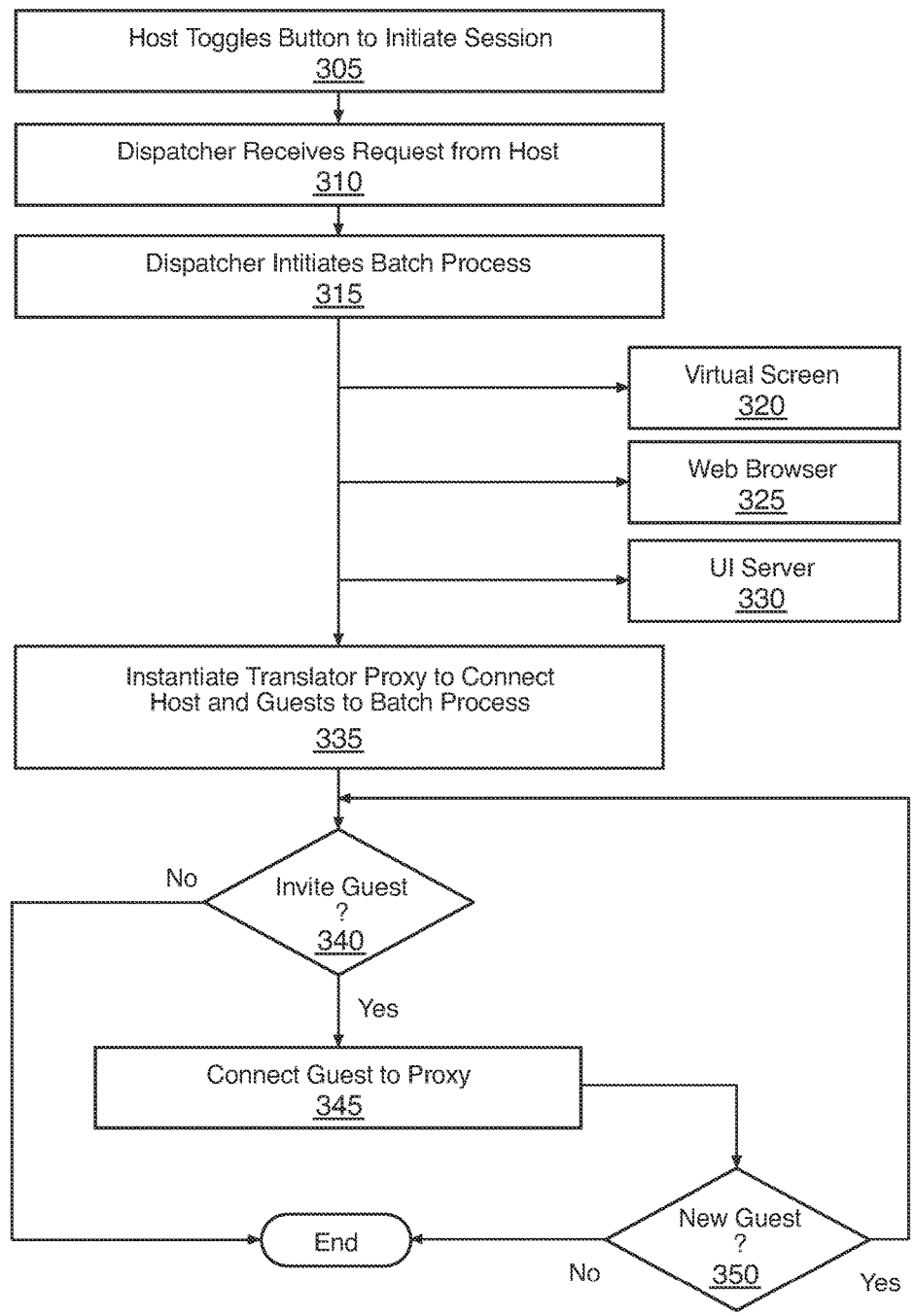
FIG. 3 is a flow diagram illustrating one embodiment for initiating a co-browsing session.

FIG. 3 is a flow diagram illustrating one embodiment for initiating a co-browsing session. A host toggles button 234 or 236 (FIG. 2) to initiate the co-browsing session (block 305). The dispatcher 235 (FIG. 2) receives a request from the host to initiate a web browsing session (block 310). In response to the request, the dispatcher initiates batch processes (block 315) that include a virtual screen (block 320), a virtual web browser (block 325), and a UI server (block 330). Then, a translator proxy is instantiated to connect the host and subsequent invited guest computers to the initiated batch processes (block 335). The host user is now connected for a web browsing session. To add one or more guests, the host, in some predetermined protocol, may invite a guest (block 340). To add a guest, the guest connects to the batch processes via a proxy, translator or otherwise. Similarly, additional guests for the co-browsing session may be entered (block 350, 340 and 345).

Figure 4:
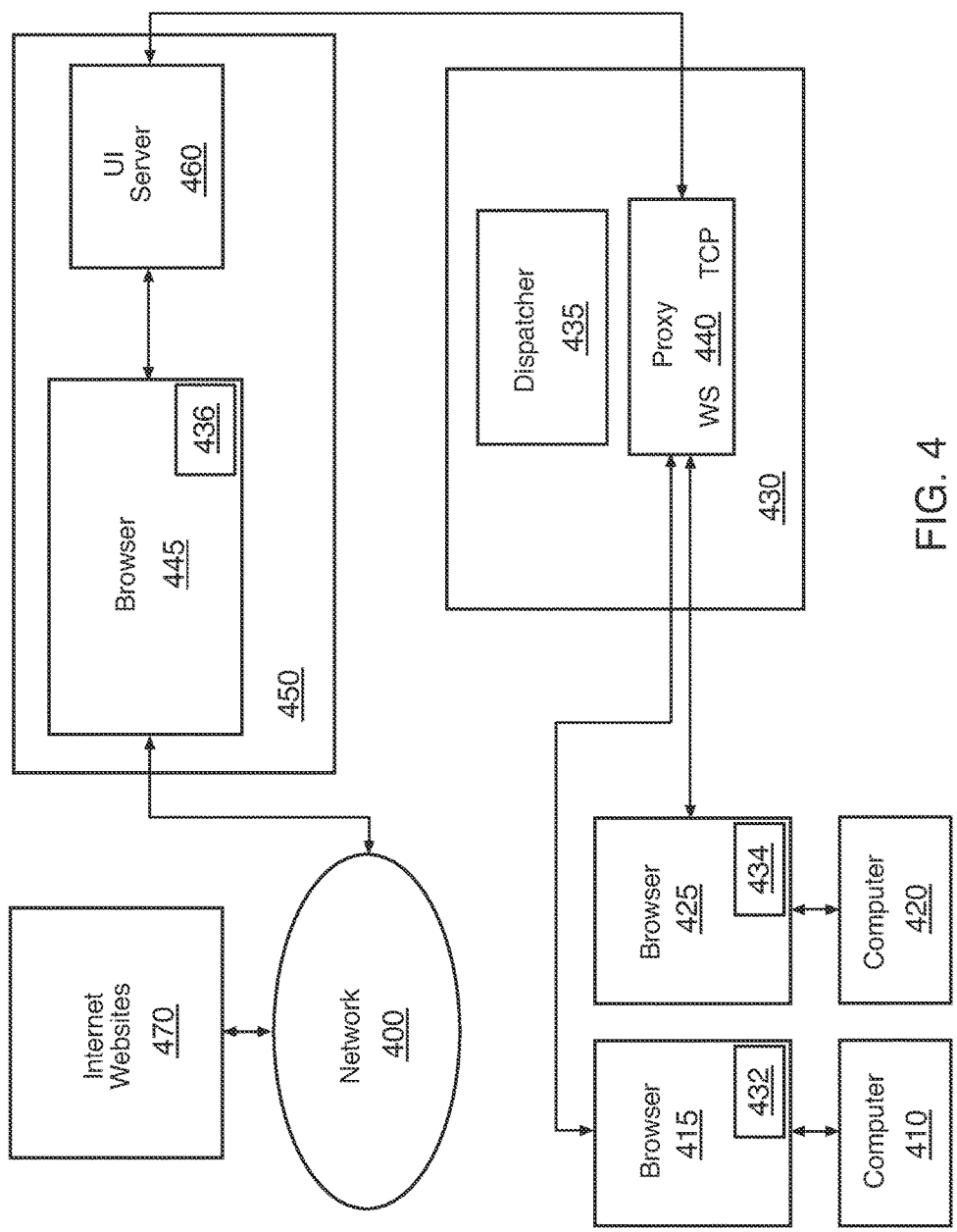
FIG. 4 is a block diagram illustrating a system configured to initiate the co-use of an application.

FIG. 4 is a block diagram illustrating a system configured to initiate the co-use of an application. To illustrate the co-use of an application, this example describes a co-browsing session. Requests to begin Web co-browsing sessions may be initiated by users as discussed previously, e.g., by toggling buttons 432, 434, and 436 within browsers 415, 425, and 445 respectively. Dispatcher 435 receives requests to begin Web co-browsing sessions and, in turn, initiates, as a batch process, UI server 460, and translator proxy 440 processes. Dispatcher 435 may also be called a "manager." UI server 460 is instantiated on computer 450 and translator proxy 440 is instantiated on virtual server 430. In conducting a co-browsing session, users, from computers 410 and 420, operating through their respective browsers (415 and 425), access a browser 445 on computer 450 via virtual server 430 and network 400 (virtual server 430 should be understood to be connected to computers 410 and 420 through network 400, though the connections are not shown in FIG. 4). Browser 445 operates to access Internet websites 470 through network 400. UI server 460 on computer 450 and monitors incoming data from browsers (415 and 425) of computers (410 and 420) and inputs the incoming data to browser 445. UI server 460 monitors screen data from browser 445 and user input from computer 450 and transmits the screen data and user input to browsers 415 and 425. UI server 460 may employ, for example, processes for communications, such as virtual network computing (VNC), or remote desktop protocol (RDP). Dispatcher 435 receives requests to begin Web co-browsing sessions and, in turn, initiates, as a batch process, UI server 460, and translator proxy 440 processes. Dispatcher 435 may also be called a "manager." Requests to begin Web co-browsing sessions may be initiated by users as discussed previously, e.g., by toggling buttons 432, 434, and 436 within browsers 415, 425, and 445 respectively.

In FIG. 4, button 436 of computer 450 was toggled to initiate the co-browsing session. After a session has been started, computers 410 and 420 access the batch processes through translator proxy 440 as described with reference to translator proxy 240 (FIG. 2). In embodiments, a proxy may be used that connects the UI server 460 to computers 410 and 420 that relies on TCP connections to connect both computers 410 and 420 to the proxy and connect the proxy to UI server 460.

In embodiments, the toggling of buttons 432, 434, and 436 may initiate the instantiation of virtual server 430 by passing a reference, e.g., a uniform resource locater (URL), to a function or set of functions that instantiates virtual server 430 and related processes on virtual server 430: translator proxy 440 and UI server 460.

In embodiments, translator proxy 440 is instantiated within the same private network as UI server 460. In some embodiments, computers 410 and 420 connect to translator proxy 440 using a WebSocket protocol. Translator proxy 440 connects to UI server 460 using, by way of example, a TCP connection. As discussed with reference to FIG. 2, the TCP connection provides an optimal protocol for communications between translator proxy 440 and UI server 460 while the translator proxy 440 supports a standard Web-Socket connection for communications between computers 410 and 420. In some embodiments, the UI server 460 may communicate directly with computers 410 and 420.

In operation, users, through computers 410 and 420, access Websites (Internet websites 470). Users enter website information into their respective browsers (415 and 425). This website information is input to browser 445 by way of translator proxy 440 and UI server 460. Browser 445 accesses internet websites 470 through a standard HTTP TCP/IP protocol. Browser 445 transmits the website information, input by the users, to internet websites 470, and retrieves website response data returned by the Website. The response data is transmitted to computers 410 and 412, through UI server 460, translator proxy 440, and browsers 415 and 425, for display at computers 410 and 412.

As the sessions are co-browsing, any user (user of computer 410 or user computer 420 or user of computer 450) may input information (keystrokes, clicks and cursor position), and the input information is both displayed on computers 450, 410, and 420, and interpreted for a web request to the Internet websites 470. In some embodiments, the co-browsing session designates computer 450 as a host and computers 410 and 420 as guests. In this example, the host computer 450 has initiated the co-browsing session with guest computers 410 and 420.

Figure 5:
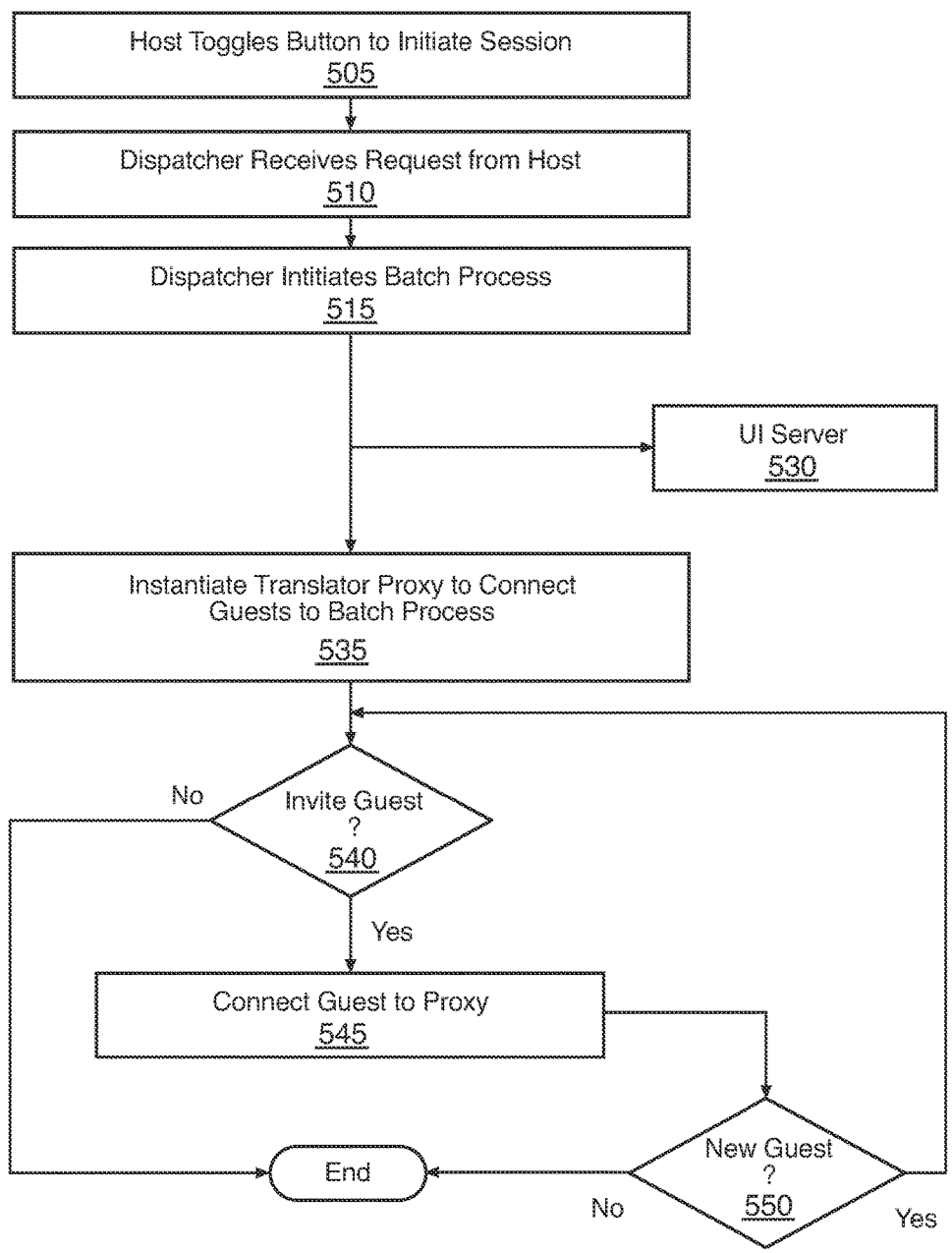
FIG. 5 is a flow diagram illustrating one embodiment for initiating a co-browsing session.

FIG. 5 is a flow diagram illustrating one embodiment for initiating a co-browsing session. A host toggles button 432, 434, or 436 (FIG. 4) to initiate the co-browsing session (block 505). The dispatcher 435 (FIG. 4) receives a request from the host to initiate a web browsing session (block 510). In response to the request, the dispatcher initiates batch processes (block 515) that include a UI server (block 530). Then, a translator proxy is instantiated to connect the host and subsequent invited guest computers to the initiated batch processes (block 535). To add one or more guests, the host, in some predetermined protocol, may invite a guest (block 540). To add a guest, the guest connects to the batch processes via a proxy, translator or otherwise (block 545). Similarly, additional guests for the co-browsing session may be entered (block 550, 540 and 545).

Figure 6:
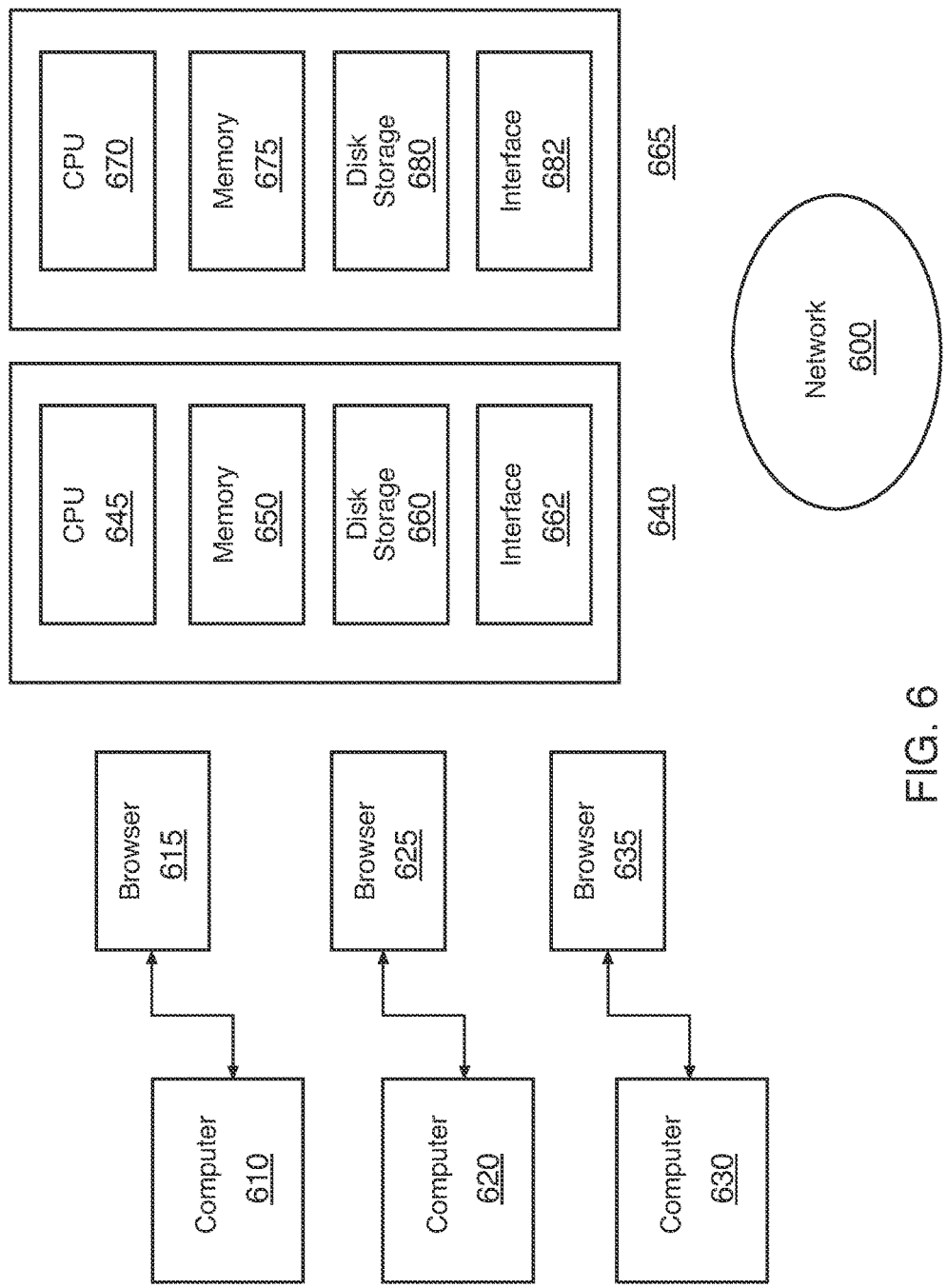
FIG. 6 is a block diagram illustrating a system to permit computers to remotely share computing resources.

FIG. 6 is a block diagram illustrating a system to permit computers to remotely share computing resources. As shown in FIG. 6, computers 610, 620 and 630 access, through network 600, resources on computer (e.g., servers) 640 and 665. Computer servers 640 and 665 include computing resources, such as CPUs (645 and 670), memory (650 and 675) and disk storage (660 and 680). Servers 640 and 665 may be high-end servers with multiple processors, large amounts of memory, and large disk arrays. Conversely, computers 610, 620 and 630 may be computing devices of limited resources, such as mobile devices, tablet devices, or laptop computers. In general, computers 610, 620 and 630 access the servers (640 and 665) to utilize the CPU, memory and disk storage resources. For example, the computers 610, 620 and 630 may interface with servers 640 and 665 to remotely execute application programs that require CPU, memory and disk storage resources. For example, computers 610, 620 and 630 may utilize computer resources on servers 640 and 665 to execute enterprise applications and to browse Internet websites. Embodiments for co-use of applications and co-browsing of Internet Websites by multiple computers are described more fully below.

For the example of FIG. 6, computers 610, 620 and 630 may use computer resources of servers 640 and 665, thereby using only a minimum amount of local computer resources. To this end, computers 610, 620 and 630 operate Internet browsers (615, 625 and 635, respectively). The computers may run any type of Internet browser, such as commercially available browsers Google Chrome, Mozilla Firefox, Microsoft Explorer, etc. In order to provide computer resources, servers 640 and 665 include interface 662 and 682, respectively. Interface 662 and 682 permit communication (exchange of data) between computers (610, 620 and 630) and servers (640 and 665) by using only a browser. To this end, interface 662 and 682 formats all requests and responses between computers (610, 620 and 630) and servers (640 and 665) to the hypertext transfer protocol (HTTP). To accomplish this, interface (662 and 682) converts input/output from the applications running on the server to an HTTP format. Computers 610, 620 and 630 only consume a minimum amount of resources to operate their browsers while utilizing computing resources of servers 640 and 665 to execute software.

FIG. 7 is a block diagram illustrating one embodiment for a computer architecture to support remote operation of applications for use by one or more computing devices. For this example, software applications, such as enterprise applications, may run on one or more servers. As used herein, an application connotes any software application program that provides functionality. In some embodiments, the applications comprise enterprise applications. As used herein, an enterprise application may include any type of application software that typically runs in an enterprise software environment, including accounting software, customer resource management (CRM) software, enterprise resource planning (ERP) software, etc. For the example of FIG. 7, servers that operate applications, including database servers, are depicted as Applications and Database Server(s) 770. A virtual server 730, which may be implemented on one or more computers, operates to remote the application for computers 710 and 720. Applications and Database Servers 770, virtual server 730 and computers 710 and 720 are all accessible through network 700 (e.g., wide area network).

For this example, computers 710 and 720 desire to share use of an application program (e.g., enterprise application) running on Applications and Database Server(s) 770. As such, computers 710 and 720 "co-use" the enterprise application (i.e., both computers interact with an applications program in a collaborative environment). In some embodiments, the application may run in a client-server environment. For the example of FIG. 7, the server portion of the application program runs on Applications and Database Servers 770, while the client portion runs on virtual server 730 for the benefit of computers 710 and 720.

For this embodiment, the virtual server 730, which may operate on one or more computers, comprises several sub-components to facilitate the remote operation of the application for the benefit of computers 710 and 720. Specifically, for this embodiment, virtual server 730 includes dispatcher 735. As is explained more fully below, dispatcher 735 initiates a session for multiple users to run enterprise software by instantiating batch processes associated with the session. For this embodiment, the batch processes include virtual screen 745, virtual client application 750 and user interface (UI) server 760. In general, virtual screen 745 stores screen data of the application for viewing on computers 710 and 720. The virtual client application 750 runs the client portion of the application and supplies screen data to virtual screen 745. UI server 760 monitors input data from computers 710 and 720 and updates input to virtual screen 745 and virtual client application 750, as appropriate. UI server 760 may implement processes such as virtual network computing (VNC) or remote desktop protocol (RDP). Proxy 740 operates to connect computers 710 and 720 to the batch processes (i.e., virtual screen 745, virtual client application 750 and UI server 760) instantiated by dispatcher 735. In embodiments, proxy 740 may comprise translation proxy, such as translation proxies 240 (FIG. 2) and 440 (FIG. 4), which connect to their respective computers using WebSocket connections, to obtain the benefits described of such an arrangement.

In operation, virtual client application 750 transmits input data to the server portion of the application (running on Applications and Database Server(s) 770). In turn, the application, running on Applications and Database Server(s) 770, outputs data, including screen data, to virtual client application 750 in a manner typical for operation in a client-server environment. Virtual server 730 transmits screen data to, and receives input data from, computers 710 and 720 via an Internet protocol.

Figure 8:
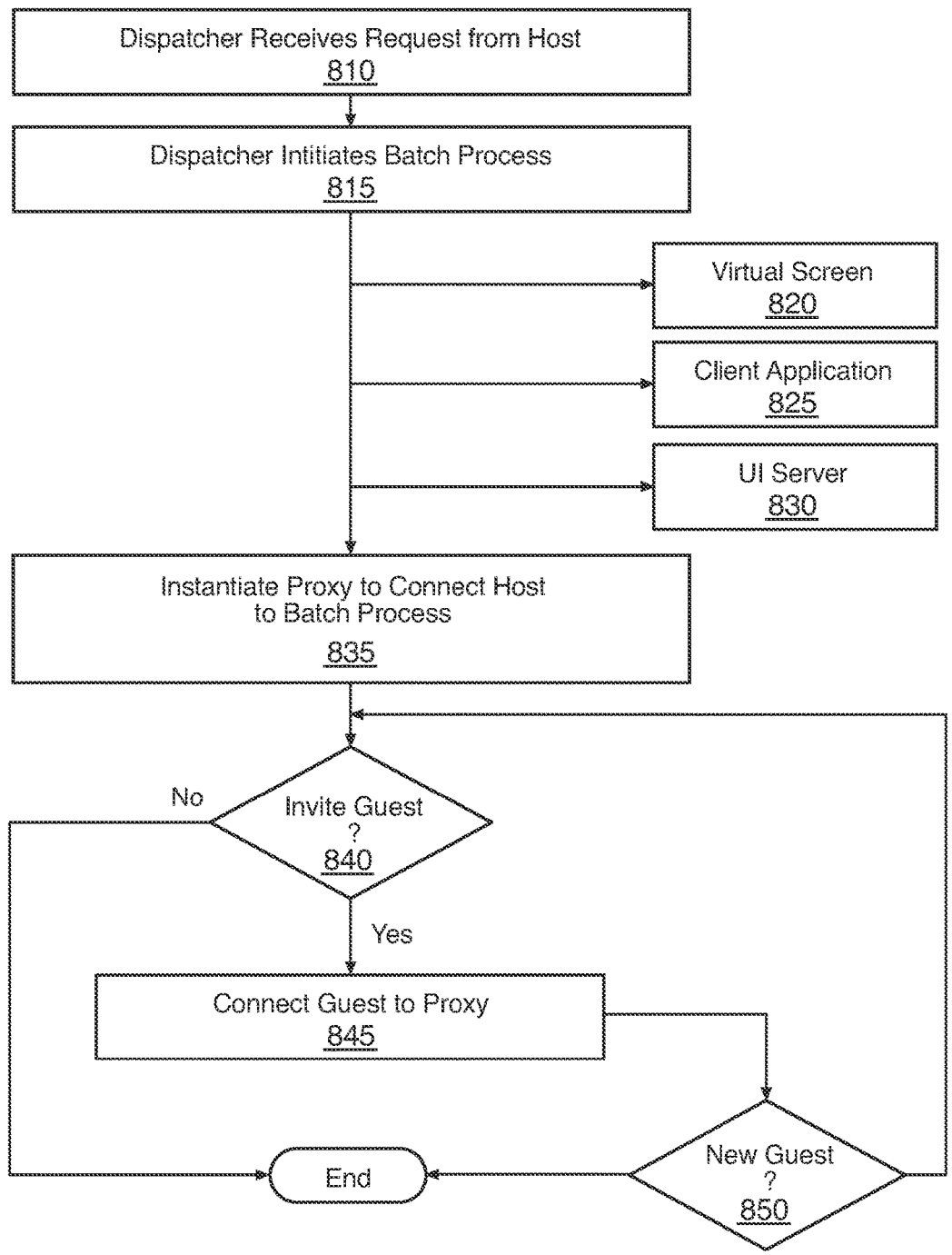
FIG. 8 is a flow diagram illustrating one embodiment to initiate a session among multiple users to co-use a software application.

FIG. 8 is a flow diagram illustrating one embodiment to initiate a session among multiple users to co-use a software application. In some embodiments, the system designates a host to initiate the co-use session with the application software. Then, the host invites one or more guests to "co-use" the resources of the software application. The process begins as the dispatcher receives a request from a host to initiate a session with the application (block 810, FIG. 8). In response to the request, the dispatcher initiates the batch processes (block 815, FIG. 8) to instantiate the virtual screen (820), client application (825) and UI server (830). Then, a proxy, which connects the host to the batch processes, is instantiated. The host may then invite one or more guests, and the guests are connected to the proxy (which connects the guests to the batch process services) (blocks 840 and 845, FIG. 8). If the host desires to add a new guest, then the process is repeated and subsequently the new user is connected to the proxy so as to gain access to the batch process services (blocks 850, 840 and 845, FIG. 8). If all guests have been connected to the batch process service, then the initialization is complete.

Figure 9:
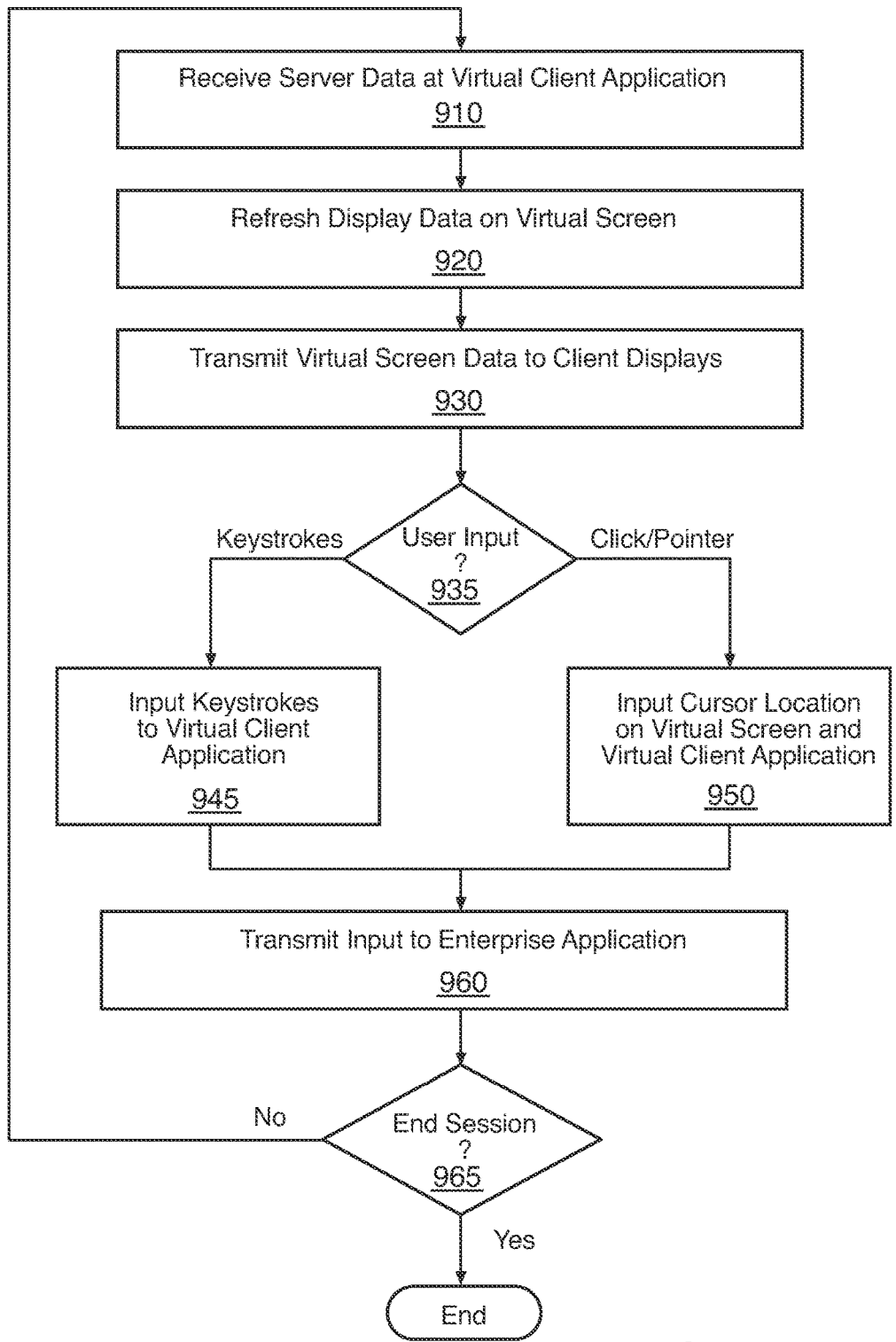
FIG. 9 is a flow diagram illustrating one embodiment for a process for multiple users to co-use an application program.

FIG. 9 is a flow diagram illustrating one embodiment for a process for multiple users to co-use an application program. As described above, the application may run on one or more remote servers, and the virtual client application forms a client-server environment with the application and database server(s). For this embodiment, the process begins when the virtual client application, running on the virtual server, receives data from the application (block 910, FIG. 9). For example, the application may comprise a login screen to facilitate a user, such as the host, to log-on to the application. In response to receiving the data at the virtual application, the display data is refreshed on the virtual screen (block 920, FIG. 9). For example, if the application transmits a logon screen, then a rendition of the logon screen is rendered on the virtual screen on the virtual server. The updated virtual screen data is then transmitted to the user computers for rendering on the various client displays. For example, if one user computer consists of a mobile device, then the application logon screen is rendered on the display of the mobile device. Similarly, if the user computer device consists of a desktop computer, with a high-resolution output display, the logon screen for the application software is rendered on the high-resolution output display. Then, the process waits for input from the user computers (block 935, FIG. 9). If the system server receives, from one or more user computers, keystrokes, then the keystrokes are input to the virtual client application (block 945, FIG. 9). If the user computer inputs a click, along with cursor position information, then the input cursor location and click are updated on the virtual screen and input to the virtual client application (blocks 935 and 950, FIG. 9). In one embodiment, the UI server monitors keystroke, click and cursor position from the user computers to perform these functions. The input data (keystroke, click and cursor position) from the user computers is transmitted to the application from the virtual client application (block 960, FIG. 9). This process, which includes receiving data from the application, transmitting screen data to the user computers, receiving input data from the user computers, and subsequently inputting data to the application, is repeated until users desire to end the session with the application.

The application co-use techniques disclosed herein support use cases for training and service of applications software. For example, a host may co-use an application to train a guest in learning to use the application. Under this use case scenario, a host may conduct transactions with the application through the virtual server. Then, a guest may interact with the application software without requiring the host to relinquish control to the guest. In contrast, in a screen sharing application, the host computer transfers control to the guest computer in order to permit the guest computer to conduct transactions with the application. As such, the application co-use techniques disclosed herein support co-using applications between users without requiring transfer of control or host screens. The application co-use techniques disclosed herein support use cases that effectively require switching control between users such that both co-users input data to the application. As such, application co-use techniques disclosed herein provide an environment for true collaboration because users are not required to execute functions in order to transfer the ability for each co-user to input data into the application.

Figure 10:
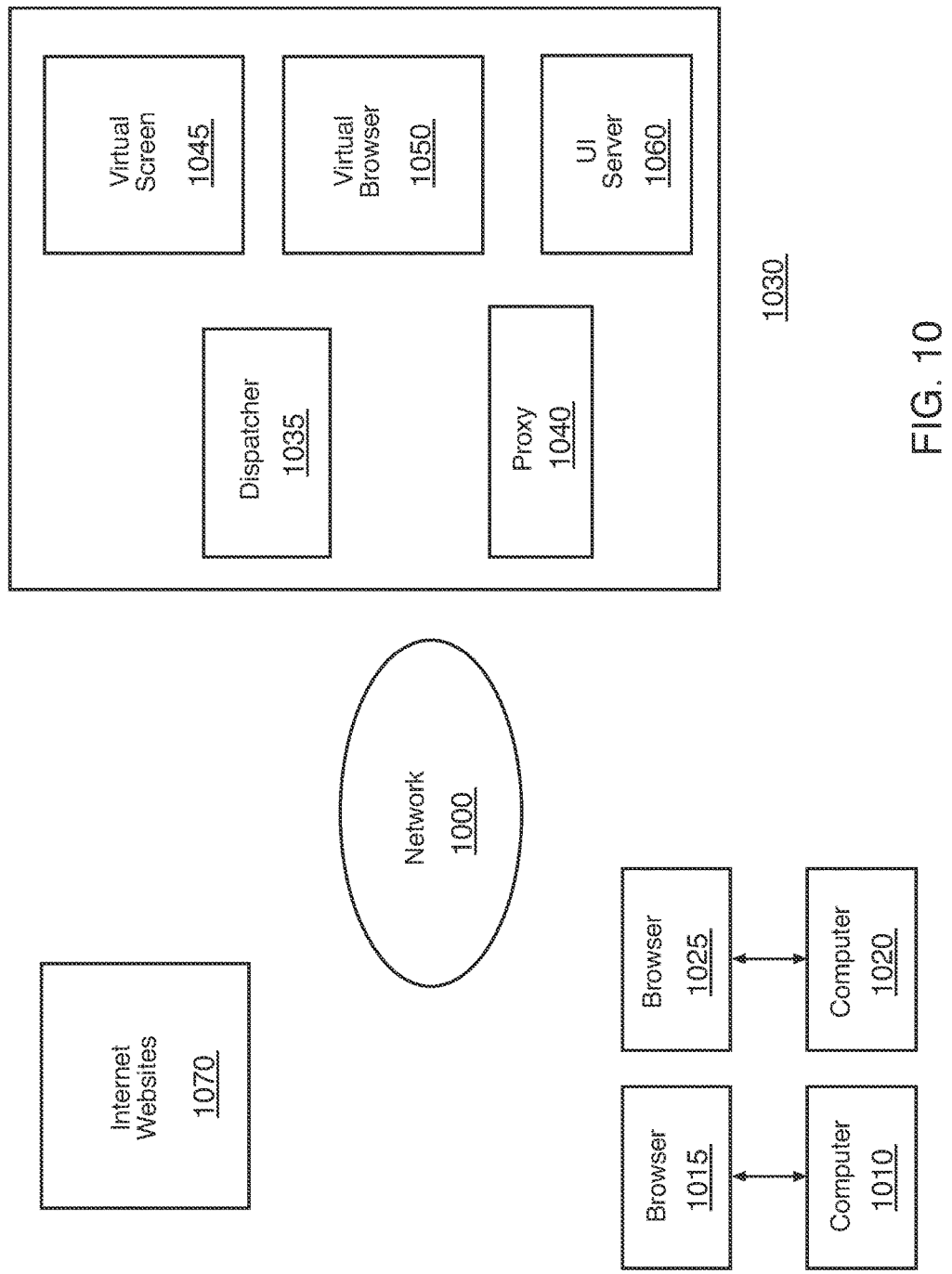
FIG. 10 is a block diagram illustrating one embodiment for implementing Internet co-browsing among multiple users.

FIG. 10 is a block diagram illustrating one embodiment for implementing Internet co-browsing among multiple users. To conduct a co-browsing session, users, from computers 1010 and 1020, operating through their respective browsers (1015 and 1025), access a virtual browser 1050 on virtual server 1030 via network 1000. The virtual browser 1050 operates to access Internet websites 1070 through network 1000. The virtual screen 1045 stores screen data for replication to computers 1010 and 1020. UI server 1060 monitors incoming data from browsers (1015 and 1025) of computers (1010 and 1020) and inputs the incoming data to virtual screen 1045 and UI server 1060. UI server 1060 may implement processes such as virtual network computing (VNC) or remote desktop protocol (RDP). The dispatcher 1035 receives requests to begin Web browsing sessions and, in turn, initiates, as a batch process, the virtual screen 1045, virtual browser 1050 and UI server 1060 processes. After a session has been started, computers 1010 and 1020 access the batch processes through proxy 1040. In embodiments, proxy 1040 may comprise a translation proxy, such as translation proxies 240 (FIG. 2) and 440 (FIG. 4), which connect to their respective computers using WebSocket connections, to obtain the benefits described of such an arrangement.

In operation, users, through computers 1010 and 1020, access Websites (Internet websites 1070). Users enter website information into their respective browsers (1015 and 1025). This website information is input to the virtual browser 1050. Virtual browser 1050, operating like browser 1015 and 1025, accesses the Internet websites through a standard HTTP TCP/IP protocol. Virtual browser 1050 transmits the website information, input by the users, to the Internet websites 1070, and retrieves website response data returned by the Website. The response data is transferred to the virtual screen 1045, and subsequently transmitted to computers 1010 and 1012, through browsers, for display at computers 1010 and 1012.

As the sessions are co-browsing, any user (user of computer 1010 or user computer 1020) may input information (keystrokes, clicks and cursor position), and the input information is both displayed on the virtual screen and interpreted for a web request to the Internet websites 1070. In some embodiments, the co-browsing session designates a host and one or more guests. For this embodiment, the host may initiate a co-browsing session with one or more guests.

Figure 11:
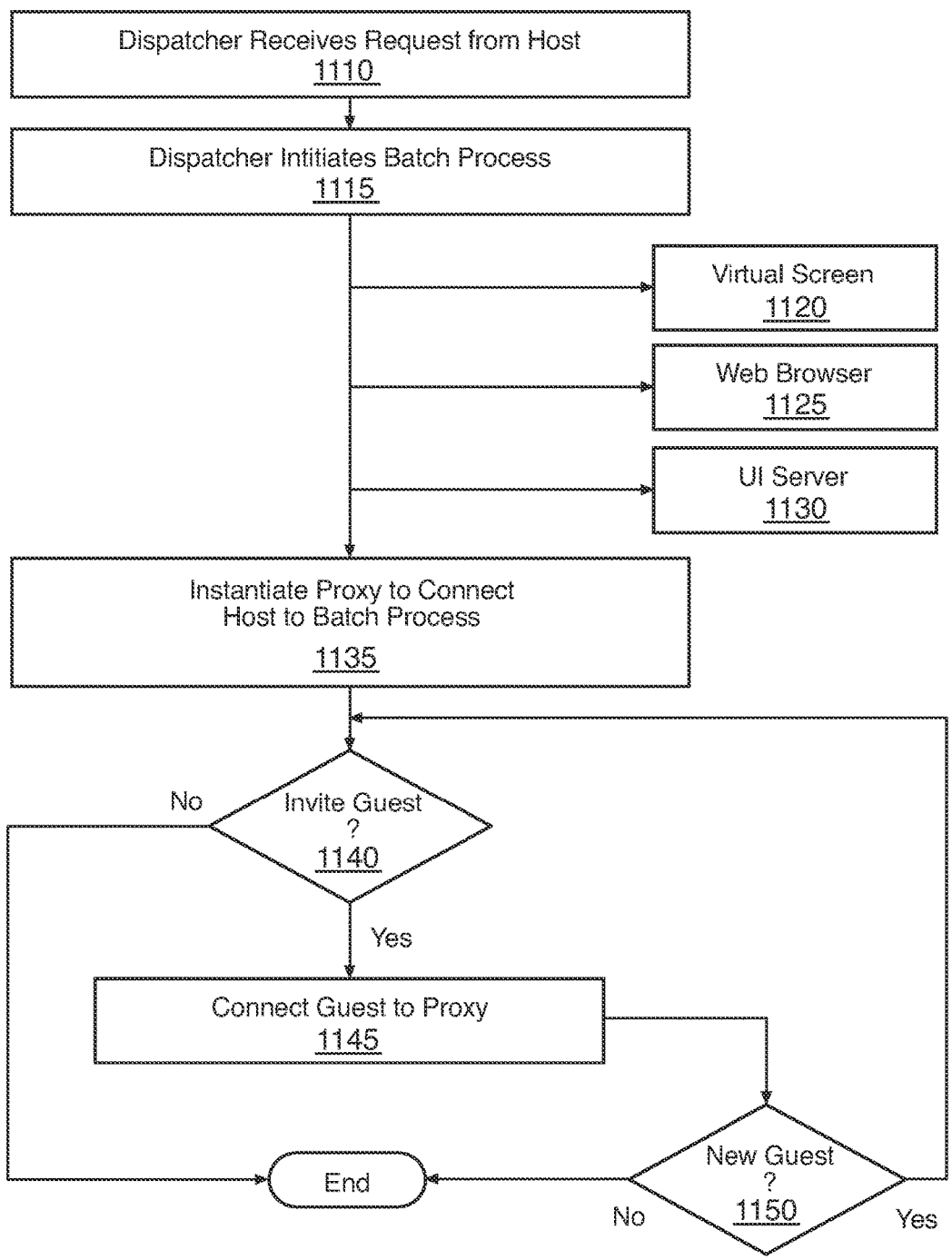
FIG. 11 is a flow diagram illustrating one embodiment for initiating a co-browsing session.

FIG. 11 is a flow diagram illustrating one embodiment for initiating a co-browsing session. The dispatcher receives a request from a host to initiate a web browsing session (block 1110, FIG. 11). In response to the request, the dispatcher initiates batch processes (block 1115, FIG. 11) that include virtual screen (block 1120), virtual web browser (block 1125) and UI server (block 1130). Then, a proxy is instantiated to connect the host computer to the initiated batch processes (block 1135). The host user is now connected for a web browsing session. To add one or more guests, the host, in some predetermined protocol, may invite a guest (block 1140, FIG. 11). To add a guest, the guest connects to the batch processes via a proxy. Similarly, additional guests for the co-browsing session may be entered (block 1150, 1140 and 1145, FIG. 11).

Figure 12:
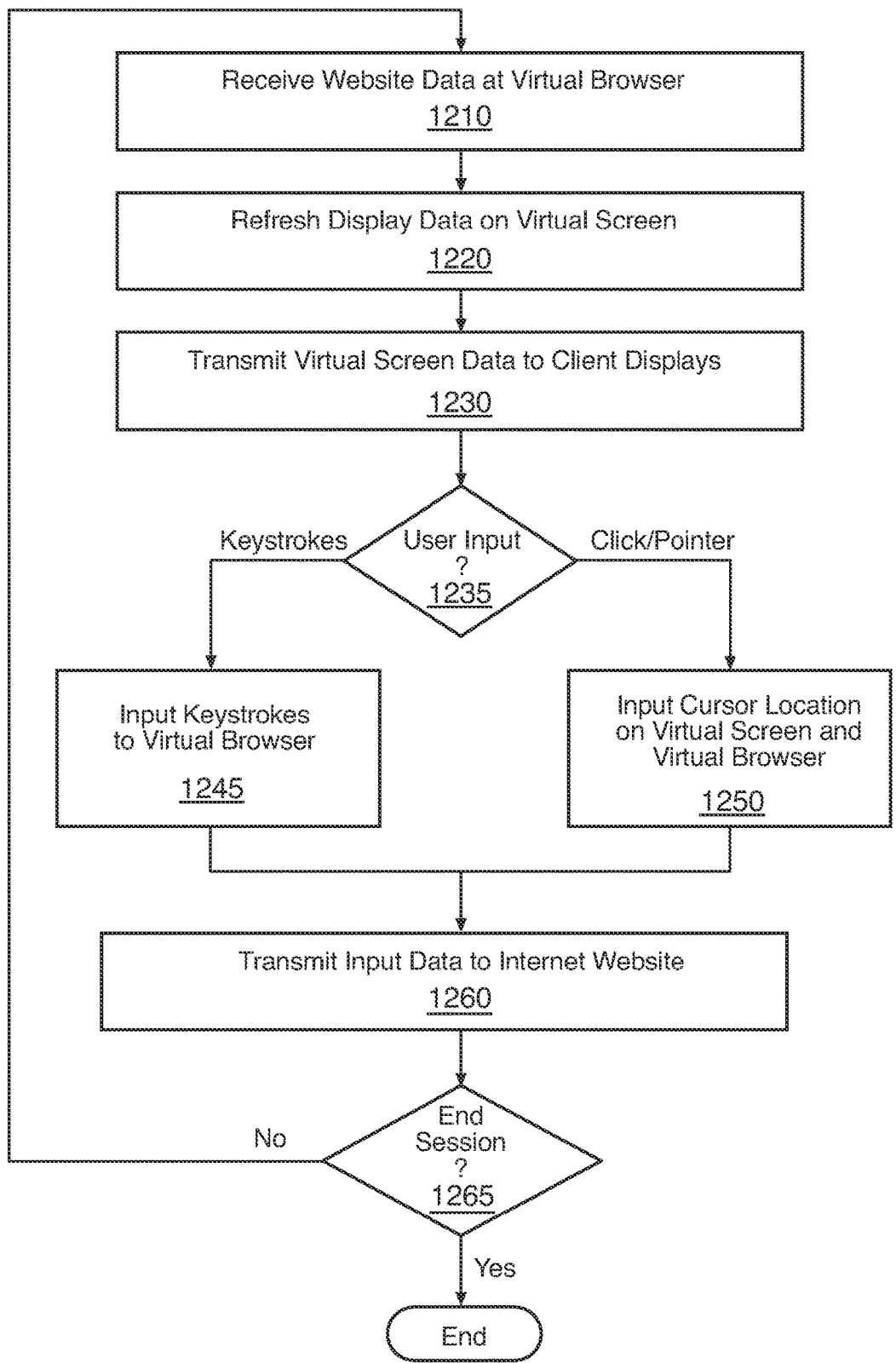
FIG. 12 is a flow diagram illustrating one embodiment for a co-browsing process.

FIG. 12 is a flow diagram illustrating one embodiment for a co-browsing process. Initially, a user sends web information to access a Website of interest. The web information is received at the virtual browser (block 1210, FIG. 12). The display screen on the virtual screen is refreshed (block 1220, FIG. 12). The virtual screen data is transmitted, over the network, for display on the user computers. The requests, including the web information, output from the user computers, are monitored to detect a user operation (i.e., input keystroke, clicks, and cursor position). If the user inputs keystrokes, then the keystrokes are input to the virtual browser, as appropriate (block 1245, FIG. 12). If the user inputs clicks and cursor position, the input cursor location is input to the virtual screen and the virtual browser (blocks 1235 and 1250, FIG. 12). In response to the input data, the virtual browser transmits the web information to Internet websites (block 1260, FIG. 12). The steps for the user to request web information from the user device and subsequently retrieve response information from the virtual server and Internet websites are repeated for each request and response cycle (blocks 1210, 1220, 1230, 1235, 1245, 1250, 1260).

Figure 13:
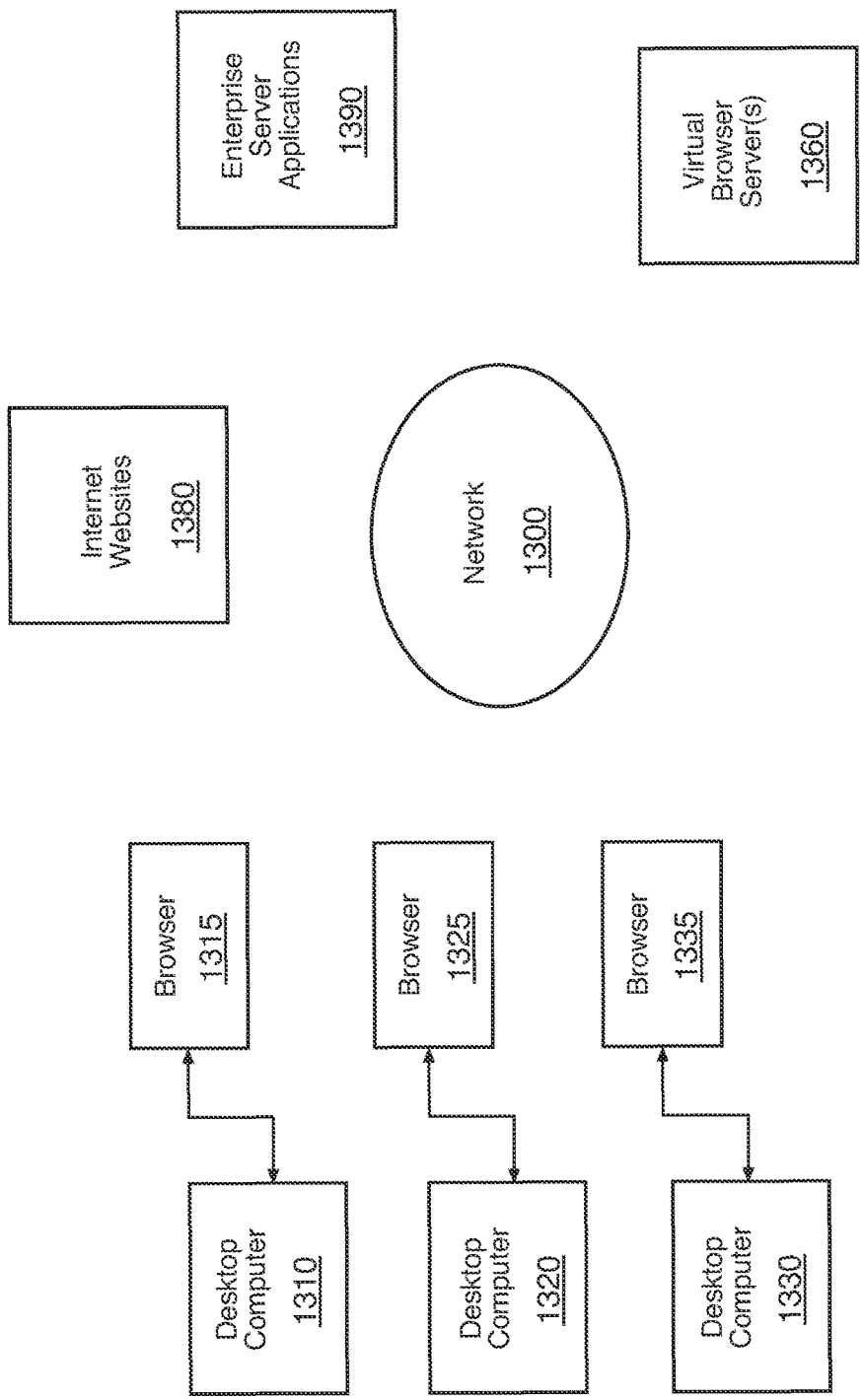
FIG. 13 is a block diagram illustrating a use case scenario for Internet co-browsing and co-using of applications.

FIG. 13 is a block diagram illustrating a use case scenario for Internet co-browsing and co-using of applications. For this example, user computers include desktop computer 1310, tablet computer 1320 and mobile phone 1330. Each computer device has different computing resources. For example, desktop computer 1310 may have a 15-inch screen, tablet computer 1320 may have an 8-inch screen while mobile device 1330 has yet an even smaller display. For this use case, virtual browser server(s) 1360 implement co-browsing for the different computer user devices. The screen data, rendered on the display of the different computing devices, originates from the virtual browser server (virtual screen). As such, the co-browsing session is not dependent on a format of any computing device of a user (e.g., desktop computer 1310, tablet computer 1320 or mobile phone 1330). In this way, a mobile device 1330 may host a web co-browsing session and the screen data from the mobile device, although originates from a small screen area, is translated to an environment appropriate for the larger desktop computer display.

A user of the mobile phone may resize the website response information to view it in a manner appropriate for a mobile device. Since both the desktop computer and a mobile computer see the data of the virtual screen, the mobile phone may resize a portion of the website response information without affecting the size and view of the Website information displayed on the desktop computer. The co-browsing sessions are also not affected by the means at which data is input to the computing devices. For example, a user may click on an image or link using a finger for a tablet computer or mobile device, and click on a link or image through a cursor control device (mouse, electrostatic pad). The input means does not affect co-browsing on the other computing devices. Also, user computer devices may include plug-ins to execute processes and services particularly suitable for the native device. The plug-ins, which enhance the user experience based on the type of computing device, do not affect data seen on other co-browsing user devices. As such, co-browsing is implemented among computers with disparate resources, including different screen sizes, input means and browser configurations.

Figure 14:
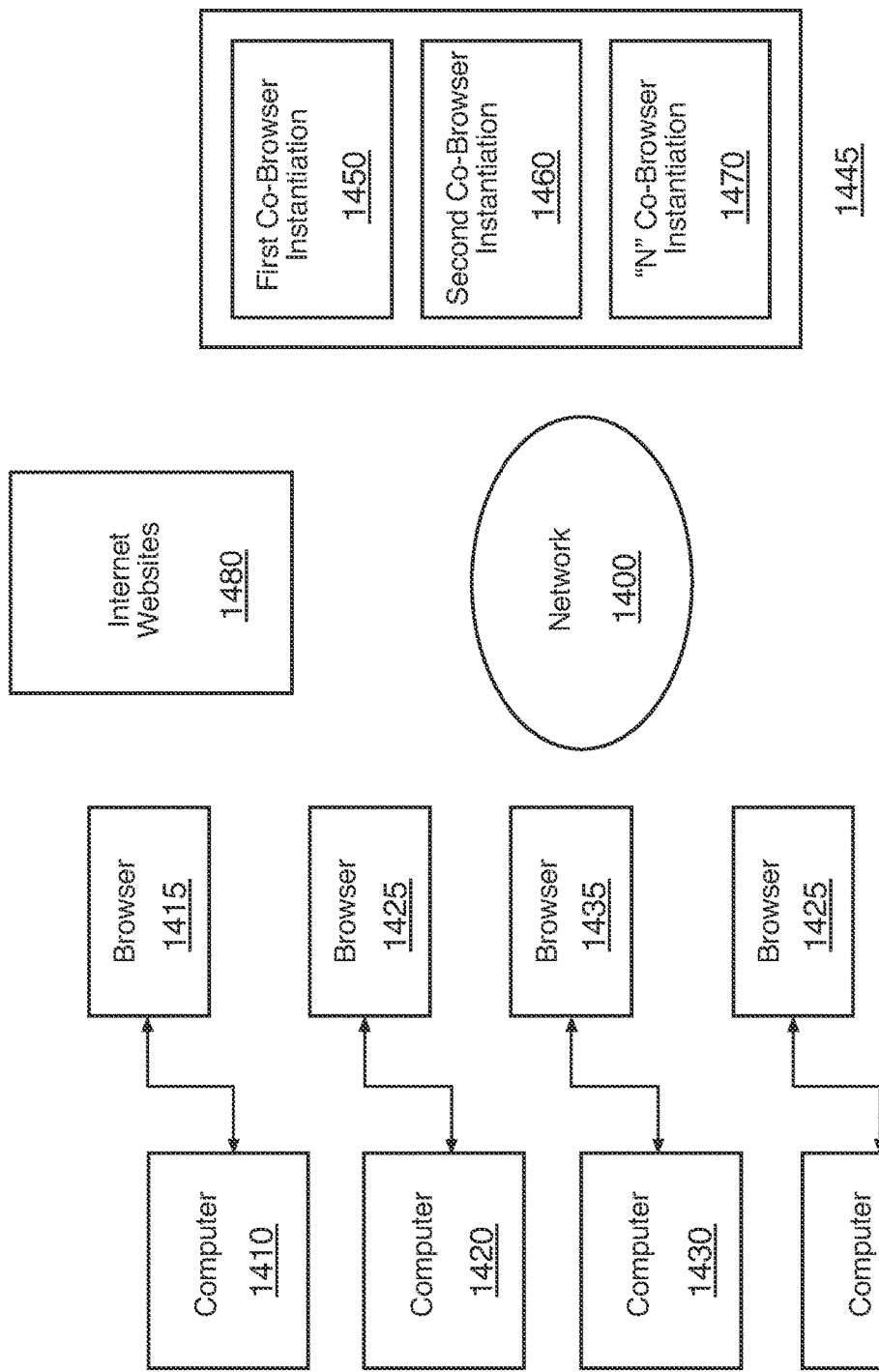
FIG. 14 is a block diagram illustrating co-browsing with multiple co-browser instantiations at the virtual server.

FIG. 14 is a block diagram illustrating co-browsing with multiple co-browser instantiations at the virtual server. As shown in FIG. 14, virtual server 1445 supports multiple co-browsing sessions simultaneously. In this way, any user on a computing device (computer 1410, 1420, 1430 and 1440) may enter into one or more co-browsing sessions with another user. For example, computer 1410, through browser 1415, may enter into a first co-browsing session with user of computer 1420. In the first co-browsing session, data is generated (i.e., cookie data collected from websites visited). Co-browsing data for the first co-browsing session may be stored in the first co-browser instantiation 1450. A second co-browsing session, supported by a second co-browser instantiation 1460, may include a browsing session with computers 1430 and 1440. Similarly, any combination of any user computers may enter into a co-browsing session to create any number of "N" co-browsing sessions. For example, computer 1410, although in a co-browsing session with computer 1420, may enter into a couple browsing session with computer 1430 or 1440.

Typically, in a co-browsing session, cookies are shared among the computers co-browsing. In the co-browsing techniques disclosed herein, session data (cookies) are not shared. All session data remains at the virtual server (on the virtual browser). As such, the co-browsing techniques disclosed herein provide a secure co-browsing environment for the user computers.

The co-browsing techniques disclosed herein support saving and securing session data for different sessions. In one use case, a host may wish to start several different sessions with different users. For sample, a host of a virtual shopping experience may start a co-browsing session with multiple users. For the example configuration shown in FIG. 14, the host user may use computer 1410 and browser 1415. The guest users, in this example, may use computers 1420, 1430 and 1440. The host computer 1410 may co-browse with computer users 1420, 1430 and 1440, to create session data in the first co-browser instantiation (1450). Then, the host user (computer 1410) may desire to create a second co-browser instantiation 1460 to conduct a one-on-one session between host computer 1410 and guest computer 1420. During co-browsing in this second co-browsing session, all session data is stored within the second co-browser instantiation 1460. In this matter, any number of sessions may be created and the co-browsing data, collected during the session, may be secured and stored. It this way, a co-browsing session may be continued in the future by using session data from a prior co-browsing session.

The co-browsing architecture disclosed herein supports the ability to co-browse among all Internet websites. Using these embodiments, websites do not require special Java enabled scripts for execution in a user computer browser. One application for co-browsing is the creation of a virtual party with multiple browsers. In one use case, a host may provide a shopping experience for one or more guests. The host may want to navigate to different websites and present different products and services to the guests. Using the co-browsing techniques described herein, the host may shop at any retailer website without restriction to only shopping at co-browser enabled websites. Similarly, a co-browsing session may be used to plan travel among one or more friends arranging a trip. Again, the co-browsing users may navigate to any website without restrictions as to whether the website is browser enabled. Since the co-browsing session to organize a trip would potentially include many different types of websites (e.g., websites for transportation, hotels, entertainment, etc.), the co-browsing techniques described herein support use cases where the co-browsing session includes many different types of websites.

Computer & Network System

Figure 15:
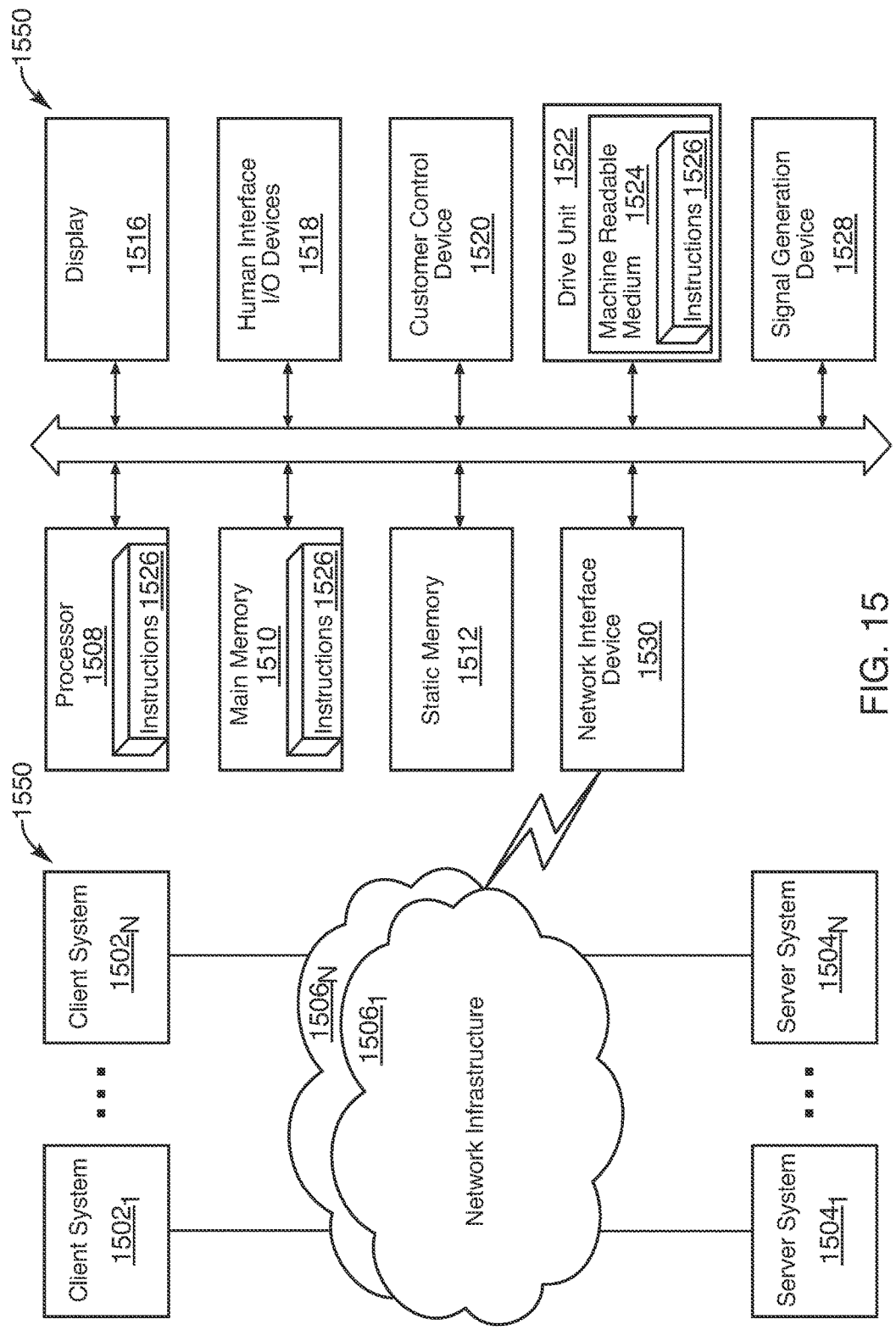
FIG. 15 is a diagrammatic representation of a network and a computer system.

FIG. 15 is a diagrammatic representation of a network 1500, including nodes for client computer systems $1502_1$ through $1502_N$, nodes for server computer systems $1504_1$ through $1504_N$, nodes for network infrastructure $1506_1$ through $1506_N$, any of which nodes may comprise a machine 1550 within which a set of instructions for causing the machine to perform any one of the techniques discussed above may be executed. The embodiment shown is purely exemplary, and might be implemented in the context of one or more of the figures herein.

Any node of the network 1500 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1550 includes a processor 1508 (e.g. a processor core, a microprocessor, a computing device, etc.), a main memory 1510 and a static memory 1512, which communicate with each other via a bus 1514. The machine 1550 may further include a display unit 1516 that may comprise a touch-screen, or a liquid crystal display (LCD), or a light emitting diode (LED) display, or a cathode ray tube (CRT). As shown, the computer system 1550 also includes a human input/output (I/O) device 1518 (e.g. a keyboard, an alphanumeric keypad, etc.), a pointing device 1520 (e.g. a mouse, a touch screen, etc.), a drive unit 1522 (e.g. a disk drive unit, a CD/DVD drive, a tangible computer readable removable media drive, an SSD storage device, etc.), a signal generation device 1528 (e.g. a speaker, an audio output, etc.), and a network interface device 1530 (e.g. an Ethernet interface, a wired network interface, a wireless network interface, a propagated signal interface, etc.).

The drive unit 1522 includes a machine-readable medium 1524 on which is stored a set of instructions (i.e. software, firmware, middleware, etc.) 1526 embodying any one, or all, of the methodologies described above. The set of instructions 1526 is also shown to reside, completely or at least partially, within the main memory 1510 and/or within the processor 1508. The set of instructions 1526 may further be transmitted or received via the network interface device 1530 over the network bus 1514.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present invention has been described in terms of specific exemplary embodiments, it will be appreciated that various modifications and alterations might be made by those skilled in the art without departing from the spirit and scope of the invention.

What is claimed is:

1. A method for performing co-using of an application, the method comprising:
   receiving, by a server system, from a first user computer, an instruction to initiate co-use of an interface to the application executing on a remote server with one or more second user computers;
   receiving, by the server system, from the first user computer a state of a first client executing on the first user computer and currently displaying the interface; and
   in response to receiving the instruction to initiate co-use of the interface with the one or more second user computers, performing, by the server system—
      retrieving the interface by a virtual client from the remote server and recreating the state of the interface by the virtual client;
      rendering, by the virtual client, in a virtual screen, the interface according to the state of the first client;
      transmitting images of the virtual screen to the first user computer and the one or more second user computers;

executing a user interface server by the server system, the user interface server receiving inputs from the first and second user computers and inputting them to the virtual client; and executing a translator proxy by the server system, the translator proxy having a persistent networking connection to the interface server and remote network connections to the first and second user computers, the persistent networking connection persisting independent of the remote network connections to the first and second user computers;

wherein the user interface server implements a plurality of network services, the method further comprising establishing persistent connections to the translator proxy for each service of the plurality of network services independent of the remote network connections to the first and second user computers;

wherein the plurality of network services include at least one of a Virtual Network Computing (VNC) service and a Remote Desktop Protocol (RDP) service; and wherein the method further comprises establishing the network connection between the first and second user computers and the translator proxy using WebSocket protocol.

2. The method of claim 1, wherein the first client is a first browser and the state of the first client includes cookies and session data for a webpage accessed by the first browser.

3. The method of claim 1, further comprising:
receiving, from the first user computer, interactions with the image of the virtual screen; and
inputting, by the server system, the interactions to the virtual client.

4. The method of claim 3, further comprising:
transmitting, by the virtual client, interface actions corresponding to the interactions to the remote server associated with the interface;
receiving, by the virtual client, a response to the interface actions from the remote server;
updating, by the virtual client, the virtual screen according to the response; and
transmitting, by the server system, an updated image of the virtual screen to the first user computer and the one or more second user computers.

5. The method of claim 1, wherein receiving from the first user computer, the instruction to initiate co-use of the interface with one or more second user computers further comprises receiving references to functions effective to instantiate the virtual client on the server system.

6. The method of claim 1, wherein at least one of the first user computer device and the one or more second computer devices is a mobile computing device.

7. The method of claim 1, further comprising establishing the persistent network connection between the interface server and the user interface server according to transport control protocol (TCP).

8. The method of claim 1, wherein the translator proxy and user interface server execute on a same computing device within the server system.

9. The method of claim 1, wherein the translator proxy and user interface server execute on different computing devices within a same local network within the server system.

10. The method of claim 1, further comprising:
maintaining the persistent network connection between the translator proxy and the interface server while performing connecting and reconnecting of the first and second user computers to the translator proxy.

11. A system comprising a server system including one or more processing devices and one or more memory devices operably coupled to the one or more processing devices, the one or more memory devices storing executable code effective to cause the one or more processing devices to:
receive an instruction to initiate co-use of an interface to the application executing on a remote server with one or more second user computers;
in response to receiving the instruction to initiate co-use of the interface with the one or more second user computers, performing, by the server system—
retrieving the interface by a virtual client from the remote server;
rendering, by the virtual client, in a virtual screen, the interface according;
transmitting images of the virtual screen to the first user computer and the one or more second user computers;
executing a user interface server by the server system, the user interface server receiving inputs from the first and second user computers and inputting them to the virtual client; and
executing a translator proxy by the server system, the translator proxy having a persistent networking connection to the interface server and remote network connections to the first and second user computers, the persistent networking connection persisting independent of the remote network connections to the first and second user computers;

wherein the user interface server implements a plurality of network services;

wherein the executable code is further effective to cause the one or more processing devices to establish persistent connections to the translator proxy for each service of the plurality of network services independent of the remote network connections to the first and second user computers;

wherein the plurality of network services include at least one of a Virtual Network Computing (VNC) service and a Remote Desktop Protocol (RDP) service; and wherein the translator proxy is further programmed to establish the network connection between the first and second user computers and the translator proxy using WebSocket protocol.

12. The system of claim 11, wherein the executable code is further effective to cause the one or more processing devices to:
receive, through the translator proxy, from the first user computer, interactions with the image of the virtual screen; and
transmit, by the translator proxy, the interactions to the user interface server.

13. The system of claim 11,
wherein the translator proxy is further programmed to establish the persistent network connection between the interface server and the user interface server according to transport control protocol (TCP).

14. The system of claim 11, wherein the translator proxy and user interface server execute on a same computing device within the server system.

15. The system of claim 11, wherein the server system comprises a first computing device, a second computing device, and a local network coupling the first and second computing devices; and
wherein translator proxy executes on the first computing device and the user interface server executes on the second computing device.

16. The system of claim 11, wherein the executable code is further effective to cause the one or more processing devices to:
 maintain the persistent network connection between the translator proxy and the interface server while performing connecting and reconnecting of the first and second user computers to the translator proxy.

\* \* \* \* \*